US012662849B2

(12) United States Patent
Varadaraju et al.

(10) Patent No.: US 12,662,849 B2
(45) Date of Patent: Jun. 23, 2026

(54) RECENTERING ADAPTERS FOR EXIT DEVICE ASSEMBLIES

(71) Applicant: Schlage Lock Company LLC, Carmel, IN (US)

(72) Inventors: Nagesh Varadaraju, Karnataka (IN); Aaron P. Mckibben, Fishers, IN (US); Joshua Boudrot, Fishers, IN (US)

(73) Assignee: Schlage Lock Company, LLC, Carmel, IN (US)

( * ) Notice: Subject to any disclaimer, the term of this patent is extended or adjusted under 35 U.S.C. 154(b) by 84 days.

(21) Appl. No.: 18/661,190

(22) Filed: May 10, 2024

(65) Prior Publication Data

US 2025/0347152 A1 Nov. 13, 2025

(51) Int. Cl.
*E05B 65/10* (2006.01)

(52) U.S. Cl.
CPC ................................ *E05B 65/1046* (2013.01)

(58) Field of Classification Search
CPC ................. E05B 65/1046; E05B 65/10; E05B 2015/0496; E05B 2015/0437; E05B 2015/1664; E05B 15/04; E05B 15/0403; E05B 2047/0037; E05B 2009/00; E05B 2009/004; Y10T 292/0822; Y10T 292/0908; Y10T 292/65; Y10T 292/1077; Y10T 292/1056; Y10T 292/104
USPC ............................................ 70/92, 380, 184
See application file for complete search history.

(56) References Cited

U.S. PATENT DOCUMENTS 2,733,089 A * 1/1956 Grevengoed ......... E05B 63/244 292/228
2,842,952 A * 7/1958 Russell ................. E05B 55/005 70/216
2,985,478 A * 5/1961 Russell ................... E05B 3/065 292/336.3
(Continued)

FOREIGN PATENT DOCUMENTS

CN 107035230 A * 8/2017 ......... E05B 47/0012
GB 2550520 A * 11/2017 ............. E05B 3/065
(Continued)

OTHER PUBLICATIONS

International Search Report; ISA/US; International Application No. PCT/US2025/028877; Aug. 19, 2025; 2 pages.
(Continued)

*Primary Examiner* — Steven A Tullia
(74) *Attorney, Agent, or Firm* — Taft Stettinius & Hollister LLP

(57) ABSTRACT

A recentering adapter for biasing a position of at least a drive spindle coupled to a first cam and a tailpiece coupled to a second cam of an exit device assembly. The recentering adapter can include a support plate having one or more protrusions and a cam having one or more arms. At least one leg of a biasing element can engage an arm of the cam as the cam is rotated away from a home position, while another leg of the biasing element remains engaged with the support plate. A cover plate and support plate can include apertures that provide first and second aperture pairs. A handing body can engage one of the first and second aperture pairs such that the handing body is positioned to engage an arm of the cam so as to limit a direction the cam is rotatable away from the home position.

19 Claims, 13 Drawing Sheets

(56) References Cited

U.S. PATENT DOCUMENTS 3,075,796 A * 1/1963 Russell .................. E05B 3/065 292/336.3
4,428,212 A * 1/1984 Best ...................... E05B 17/007 292/336.5
4,569,547 A * 2/1986 Fayerman ............... E05B 3/065 292/DIG. 60
5,157,952 A * 10/1992 Lin ....................... E05B 55/005 70/216
5,529,354 A * 6/1996 Studt ....................... E05B 3/065 292/336.3
5,727,406 A * 3/1998 Banducci ................ E05B 3/065 292/336.3
5,784,909 A * 7/1998 Huang .................. E05B 55/005 292/357
5,813,708 A * 9/1998 Shen ....................... E05B 15/04 292/336.3
5,820,178 A * 10/1998 Ellis ........................ E05B 3/065 292/336.3
6,101,856 A * 8/2000 Pelletier ................ E05B 13/101 70/472
6,279,360 B1 * 8/2001 Shen ......................... E05B 3/06 292/357
6,322,113 B1 * 11/2001 Ayers ...................... E05C 3/162 292/226
6,386,602 B1 * 5/2002 Lan ......................... E05B 3/065 292/357
7,036,856 B2 * 5/2006 Fishencord ........... E05B 55/005 292/336.3
7,178,373 B2 * 2/2007 Shen ................... E05B 17/0062 292/169.22
7,249,477 B2 * 7/2007 Toloday .............. E05B 63/0065 70/279.1
7,258,374 B2 * 8/2007 Rusiana .................... E05C 1/14 292/336.3
7,364,212 B1 * 4/2008 Fan ......................... E05B 1/003 292/336.3
7,559,219 B2 * 7/2009 Chen ................... E05B 65/1086 292/336.3
7,823,427 B2 * 11/2010 Katagiri ................ E05B 47/063 70/380
7,900,978 B2 * 3/2011 Zimmer .................. E05B 3/065 292/336.3
8,011,702 B2 * 9/2011 Tien .................... E05B 65/1006 70/92
8,022,299 B2 * 9/2011 Zheng ................... E05B 13/001 174/67
8,070,194 B2 * 12/2011 Houis ....................... E05B 3/00 292/336.3
8,746,760 B2 * 6/2014 Chen ....................... E05B 3/065 292/357
9,611,672 B2 * 4/2017 Murphy .............. E05B 15/0033
9,631,400 B2 4/2017 Liu et al.
10,248,153 B2 * 4/2019 Stoufer .................... G05G 5/05
10,316,544 B2 * 6/2019 Mitchell ................. E05B 15/02
10,508,468 B2 * 12/2019 Murphy .................. E05B 15/16
10,597,900 B2 * 3/2020 Holman .................... E05B 3/04
11,035,148 B2 * 6/2021 Mitchell ................. E05B 63/04
11,549,285 B2 * 1/2023 Stenhouse ............. E05B 63/185
11,946,288 B2 * 4/2024 Huang .................... E05B 63/16
12,006,734 B2 * 6/2024 Varadaraju ............ E05B 63/042
12,060,731 B2 * 8/2024 Jones ....................... G07C 9/00
2005/0274163 A1 12/2005 Shen et al.
2009/0056391 A1 * 3/2009 Mathachan ........... E05B 13/002 70/91
2022/0403920 A1 12/2022 Varadaraju et al.

FOREIGN PATENT DOCUMENTS

KR 20210079011 A * 6/2021 ............. E05B 63/22
WO WO-2013134188 A1 * 9/2013 ......... E05B 63/0065

OTHER PUBLICATIONS

Written Opinion of the International Searching Authority; ISA/US; International Application No. PCT/US2025/028877; Aug. 19, 2025; 11 pages.

* cited by examiner

U.S. Patent Jun. 23, 2026 Sheet 13 of 13 US 12,662,849 B2

RECENTERING ADAPTERS FOR EXIT DEVICE ASSEMBLIES

TECHNICAL FIELD

The present disclosure generally relates to exit device assemblies, and more particularly, but not exclusively, to modular recentering adapters for interfaces between electrically activatable trim assemblies and pushbar assemblies for exit device assemblies.

BACKGROUND

Exit device assemblies can include a pushbar assembly mounted to an egress side of a door, and a trim assembly mounted to the non-egress side of the door. Such exit device assemblies also often include a latch control assembly having a latch that is displaceable between extended and retracted positions via selective operation of the trim and pushbar assemblies. With at least certain types of exit device assemblies, the transfer of power from the operation of a lever or knob of the trim assembly or a pushbar of the pushbar assembly to extend/retract the latch includes use of a corresponding clutch, among other components. Yet, such operation of clutches can be adversely impacted when at least certain components of the exit device assembly do not return to a home position for that component(s). Moreover, at least certain components of the exit device assembly failing to return to a corresponding home position can prevent at least the latch from returning to a fully extended position. A failure of the latch to return to a fully extended position can adversely impact the use of the latch control assembly, including with respect to the locking and/or unlocking of the exit device assembly.

SUMMARY

The present disclosure may comprise one or more of the following features and combinations thereof.

In one embodiment of the present disclosure, a recentering adapter is provided for biasing a position of at least a drive spindle and a tailpiece of an exit device assembly. The recentering adapter can include a housing having a first opening and a cover having a second opening, the cover being configured for removable coupling to the housing. Further, the cover and the housing can define at least a portion of an interior area of the recentering adapter. The recentering adapter can also include a support plate that can be configured for placement in the interior area, and can include one or more protrusions. The recentering adapter can further include a biasing element having a first leg and a second leg, at least a portion of at least one protrusion of the one or more protrusions can be positioned in a gap between the first and second legs of the biasing element. Additionally, the recentering adapter can include a cam having a first end, a second end, and one or more arms. The first end can be aligned with the first opening and configured for coupling to the tailpiece, and the second end can be aligned with the second opening and configured for coupling to the drive spindle. The cam can be positioned for a rotational displacement in a first direction or a second direction from a home position within the interior area. When the cam is rotated in the first direction, the first leg of the biasing element can be displaced by an engagement with at least one arm of the one or more arms as the cam is rotated while the second leg can remain engaged with the at least one protrusion. Additionally, the biasing element can engage the cam to bias the cam to the home position.

Additionally, another embodiment provides a recentering adapter that can include a housing having a first opening and a cover plate having a second opening, the cover plate being selectively attachable to the housing. The housing and the cover plate can define an interior area of the recentering adapter. The recentering adapter can also include a support plate having a first protrusion, a second protrusion, and a support plate opening, and a cam having a first end, a second end, a first arm, and a second arm. The cam can be configured for the first end to align with the first opening and the second end to algin with the second opening as a portion of the cam is positioned within the support plate opening. The cam can also be rotatably displaceable relative to the support plate. The recentering adapter can further include a biasing element having an orifice, a first leg, and a second leg. The first and second legs can define an adjustable gap between the first and second legs, and at least a portion of the second protrusion and the second arm can be positioned within the adjustable gap. When the cam is selectively rotated away from a home position in a first direction, the first leg can be displaced with the second arm away from the second protrusion as the second leg remains engaged with the second protrusion, thereby increasing a width of the adjustable gap. Further, the biasing clement can engage the cam to bias the cam to the home position.

A further embodiment of the subject disclosure provides a recentering adapter that can include a housing having a first opening and a cover plate having a second opening, a first outer handing aperture, and a second outer handing aperture. The cover plate can be selectively attachable to the housing, and the housing and the cover plate can define an interior area of the recentering adapter. The recentering adapter can also include s support plate having a first protrusion and a second protrusion. The first protrusion can have a first inner handing aperture and a second inner handing aperture. The first inner handing aperture and the first outer handing aperture can provide a first aperture pair, and the second inner handing aperture and the second outer handing aperture can provide a second aperture pair. The recentering adapter can also include a cam having a first end, a second end, a first arm, and a second arm, the cam being configured for the first end to align with the first opening and the second end to algin with the second opening as a portion of the cam is positioned within the interior area. Additionally, the cam can be configured for a rotational displacement of the cam relative to the support plate. The biasing element can include a first leg and a second leg, the first and second legs defining an adjustable gap between the first and second legs, at least a portion of the second protrusion and the second arm being positioned within the adjustable gap. Further, the recentering adapter can include a handing body configured for selective insertion into either the first aperture pair or the second aperture pair. When the handing body is selectively positioned in the first aperture pair, the handing body can be positioned to engage the first arm to prevent the rotational displacement of the cam away from a home position in a second direction. Further, when the handing body is selectively positioned in the second aperture pair, the handing body is positioned to engage the first arm to prevent the rotational displacement of the cam away from the home position in a first direction that is opposite to the second direction. Additionally, as the cam is selectively rotated away from a home position in the first direction, the first leg can be displaced with the second arm away from the second protrusion as the second leg remains engaged with the second protrusion. As the cam is selectively rotated away from the home position in the second direction, the second leg can be displaced with the second arm away from the second protrusion as the first leg remains engaged with the second protrusion. Further, the biasing element can be engaged with the cam to bias the cam to the home position.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE ILLUSTRATIVE EMBODIMENTS

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

Figure 1:
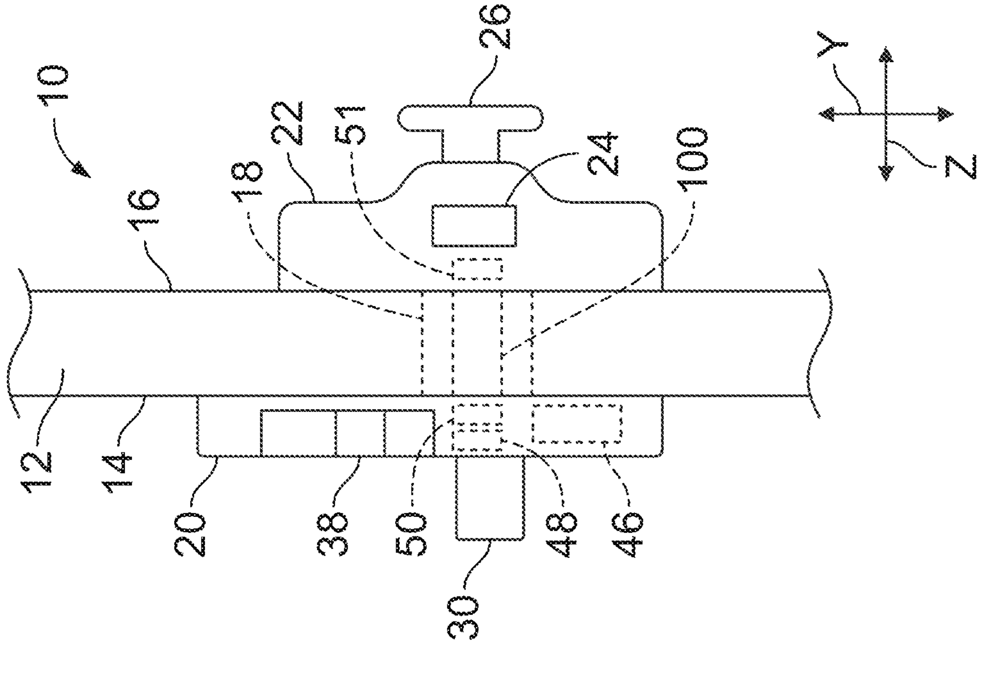
FIG. 1 illustrates an exemplary representation of an exit device assembly installed on a door.

FIG. 1 illustrates an exemplary representation of an exit device assembly 10 installed on a door 12. The door 12 generally includes a first side 14, such as, for example, a non-egress side, and an opposing second side 16, such as, for example, an egress side. When the door 12 is in its closed position, the first side 14 can face an exterior or outer region, and the second side 16 can face an interior or access-controlled region. Additionally, a door preparation 18, such as, for example, a counterbore, is formed in the door 12 and defines a pathway between the first side 14 and the second side 16. The exit device assembly 10 generally includes a trim assembly 20 installed to the first side 14, a pushbar assembly 22 installed to the second side 16, and a recentering adapter 100 seated in the door preparation 18 and operably connecting the trim assembly 20 and the pushbar assembly 22. The illustrated pushbar assembly 22 includes a latch mechanism 24 and a pushbar 26 operable to actuate the latch mechanism 24. The trim assembly 20 is at least selectively operable to also actuate the latch mechanism 24, including, for example, via transmission by the recentering adapter 100 of at least a force from the trim assembly 20 to the pushbar assembly 22.

Figure 2:
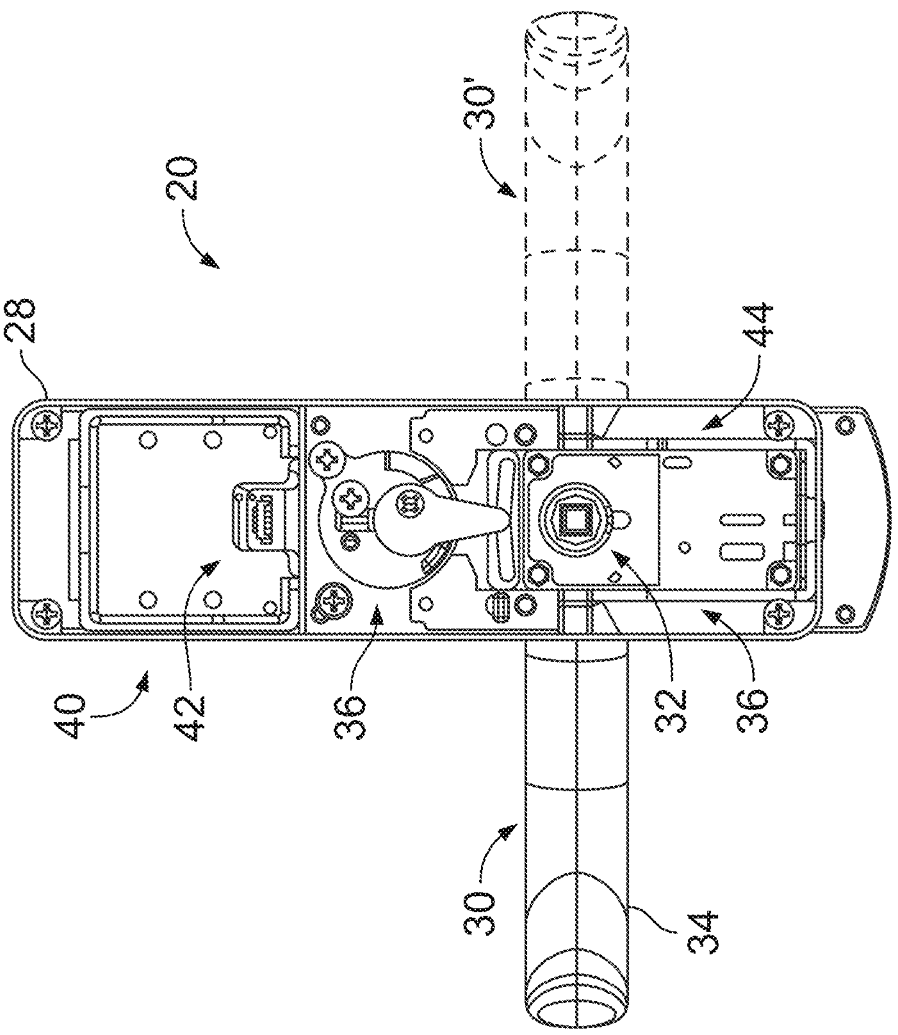
FIG. 2 illustrates a rear plan view of an exemplary trim assembly for the exit device assembly shown in FIG. 1.
Figure 3:
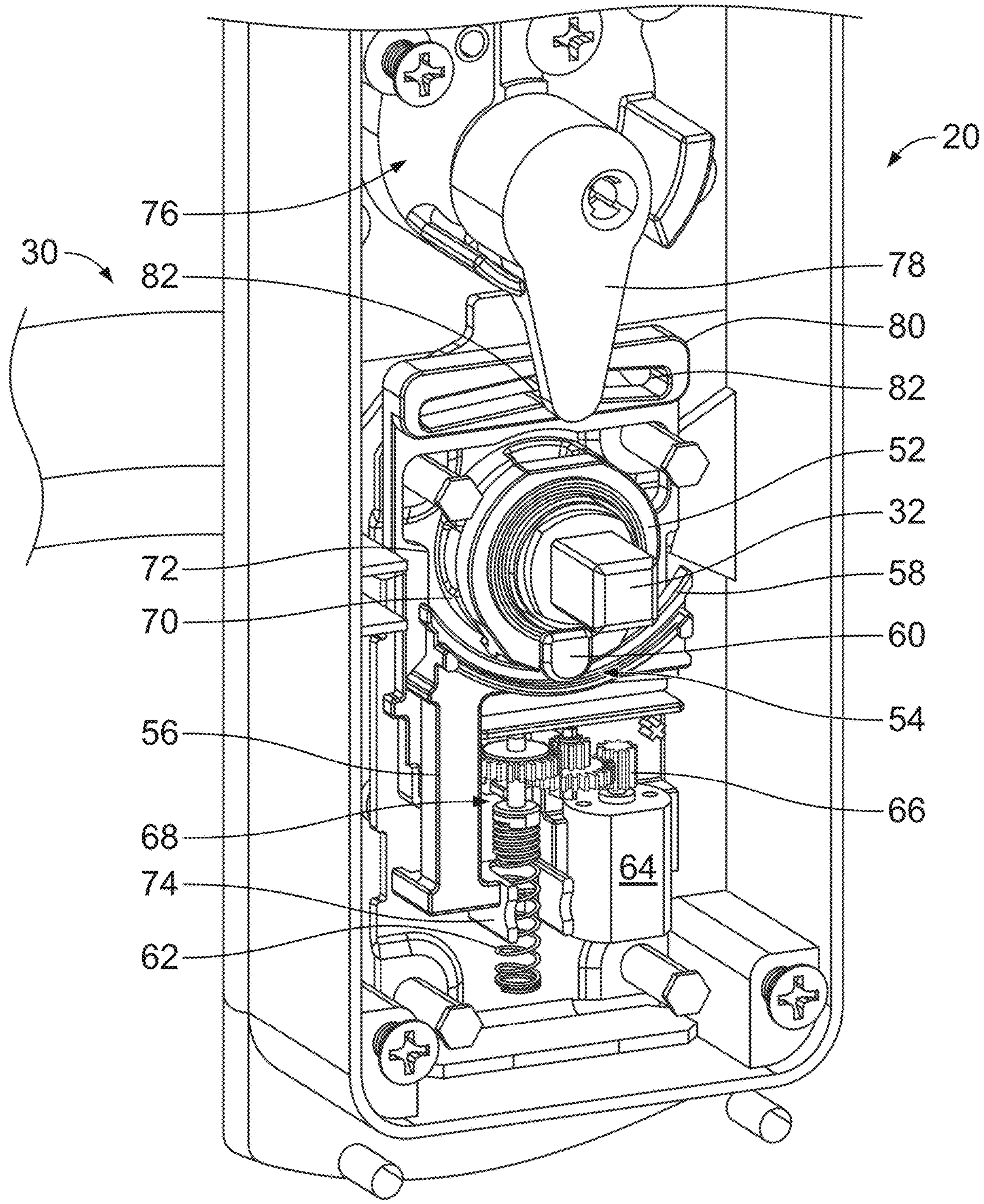
FIG. 3 illustrates a perspective view of a portion of the trim assembly shown in FIG. 2.

As seen in at least FIGS. 2 and 3, the trim assembly 20 generally includes an escutcheon plate 28, a handle 30, and a driver spindle 32, the handle 30 being rotatably mounted to the escutcheon plate 28, and the drive spindle 32 being at least selectively connected to the handle 30. Rotation of the drive spindle 32 is transferred via at least the recentering adapter 100 to facilitate an actuation of the latch mechanism 24. In certain embodiments, the trim assembly 20 can further include an electromechanical lock mechanism 36 that is selectively controllable by a control assembly 40. The electromechanical lock mechanism 36 can, in response to one or more signals from the control assembly 40, be selectively operable to connect the electromechanical lock mechanism 36 with the drive spindle 32. Additionally, according to certain embodiments, the trim assembly 20 can further include a credential reader 38 that is communicatively coupled to the control assembly 40. In addition, or as an alternative, to the electromechanical lock mechanism 36, the trim assembly 20 can include a mechanical lock mechanism 42 operable to selectively connect the handle 30 with the drive spindle 32.

The escutcheon plate 28 is configured to be mounted to the first side 14 of the door 12, and generally defines a chamber 44 in which various components of the trim assembly 20 can be mounted. For example, the electromechanical lock mechanism 36 can be mounted in the chamber 44 along with the drive spindle 32. Additionally, at least a portion of the credential reader 38 can be mounted in the chamber 44 such that a front face of the credential reader 38 is accessible from outside the escutcheon plate 28.

The handle 30 is rotatably mounted to the escutcheon plate 28, and is at least selectively operable to cause rotation of the drive spindle 32. Moreover, the drive spindle 32 can be engaged with the handle 30 such that the handle 30 is at least selectively operable to rotate the drive spindle 32. Further, when the handle 30 is connected with the drive spindle 32, rotation of the handle 30 in either handle direction can cause a corresponding rotation of the drive spindle 32 in a corresponding drive spindle direction. Rotation of the drive spindle 32 via, for example, operation of the handle 30, is operable to facilitate actuation of the latch mechanism 24 using a force that is transmitted from the drive spindle 32 via at least the recentering adapter 100.

In the illustrated form, the handle 30 is provided in the form of a lever handle that includes a horizontally extending shank and a grip portion 34 on the shank. In other embodiments, the handle 30 can be provided in another form, such as that of a knob handle in which the grip portion is provided as a knob. As described herein, the handle 30 may be selectively coupled with the drive spindle 32 and the lock mechanism 46. It is also contemplated that the handle 30 may be at all times coupled with the drive spindle 32.

In the illustrated embodiment, the handle 30 is mounted to the escutcheon plate 28 in a right-handed orientation, in which the lever or grip portion 34 extends from the shank primarily in a rightward direction when viewing the front of the trim assembly 20. In this right-handed orientation for the trim assembly 20, pressing the lever or grip portion 34 downward pivots the handle 30 in a first direction (counterclockwise in FIG. 2) from a locked position, as seen in FIG. 2, to an unlocked position. Thus, with respect to such a right-handed orientation of the trim assembly 20, the lever or grip portion 34 is similarly configured to be upwardly pivoted (clockwise in FIG. 2) to return from the unlocked position to the locked position. Additionally, a spring 48, among other biasing elements, can be utilized to bias the handle 30 to the locked position.

In added to the handle 30 being handed for a right-handed orientation, the handle 30 can also instead be mounted to the escutcheon plate 28 in a left-handed orientation in which the lever or grip portion 34 extends from the shank primarily in a leftward direction when viewing the front of the trim assembly 20. In this left-handed orientation (illustrated in phantom in FIG. 2 as the left-handed orientation for the handle 30'), pressing the lever or grip portion 34 downward pivots the handle 30 in the second direction (clockwise in FIG. 2) from the locked position to the unlocked position. Similarly, in the left-handed orientation, the lever or grip portion 34 can also upwardly pivot (counterclockwise in FIG. 2) when returning from the unlocked position to the locked position.

The trim assembly 20 can further include a first cam assembly 50 that is configured to selectively couple the drive spindle 32 to either, or both, the electromechanical lock mechanism 36 and the handle 30. According to such embodiments, one or more projections or notches of the first cam assembly 50 can be selectively received in one or more mating slots or grooves of the first cam assembly 50 so as to selectively couple the drive spindle 32 to either, or both, the electromechanical lock mechanism 36 and the handle 30. Similarly, the drive spindle 32 can be selectively decoupled from the either, or both, the electromechanical lock mechanism 36 and the handle 30 via the removal of such projections or notches from the mating slots or grooves of the first cam assembly 50. However, for at least some lock assemblies, the ability of such slots or grooves of the first cam assembly 50 to be received, or removed, from the mating slots or grooves can be at least partially dependent on attaining proper alignment between the projections/notches and the mating slots/grooves, which, as discussed below can be aided by the recentering adapter 100 facilitating a return of a displaced drive spindle 32 to an associated home position for the drive spindle 32.

For example, the illustrated drive spindle 32 is rotationally coupled with a collar 52 that includes a notch 54. Further, the electromechanical lock mechanism 36 includes movable wall 56 having an arcuate surface 58 that supports a coupler 60, a coil spring 62 engaged with the movable wall 56, a gear train 68 operable to rotate the coil spring 62, and a motor 64 including a motor shaft 66 operable to rotate the gear train 68. The coupler 60 has a coupling position and a decoupling position, and is biased toward the decoupling position, for example by a spring. In the coupling position, the coupler 60 is partially received in one of the adapter notches 70, and is partially received in the collar notch 54 such that the coupler 60 extends between and rotationally couples an adapter 72 and the collar 52. As a result, the handle 30 is operably coupled with the drive spindle 32 and is operable to rotate the drive spindle 32 to actuate the latch mechanism 24; the trim assembly 20 is thus in an unlocked state. In the decoupling position, the coupler 60 is removed from the notches 54, 70 such that the adapter 72 is rotationally decoupled from the collar 52. As a result, the handle 30 is inoperable to rotate the drive spindle; the trim assembly 20 is thus in a locked state.

As set forth above, the coupling position of the coupler 60 corresponds to the unlocked state of the trim assembly 20, and the decoupling position of the coupler 60 corresponds to the locked state of the trim assembly 20. The arcuate surface 58 of the movable wall 56 is engaged with the coupler 60 such that movement of the movable wall 56 between an upper position and a lower position drives the coupler 60 between its coupling and decoupling positions. More particularly, when the movable wall 56 is in its upper position, a support surface retains the coupler 60 in its coupling position, thereby unlocking the trim assembly 20. As such, the upper position of the movable wall 56 corresponds to the coupling position of the coupler 60 and the unlocked state of the trim assembly 20, and may alternatively be referred to as the unlocking position. When the movable wall 56 is in its lower position, the coupler 60 moves to the decoupling position to which the coupler 60 is biased, thereby locking the trim assembly 20. As such, the lower position of the movable wall 56 corresponds to the decoupling position of the coupler 60 and the locked state of the trim assembly 20, and may alternatively be referred to as the locking position.

The motor 64 is operable to rotate the motor shaft 66 in each of a first direction and a second direction under control of the control assembly 40. Rotation of the motor shaft 66 in the first direction causes the gear train 68 to rotate the coil spring 62 in a locking direction, and rotation of the motor shaft 66 in the second direction causes the gear train 68 to rotate the spring 62 in an unlocking direction. During rotation of the spring 62 in the locking direction, the coils of the spring 62 engage a projection 74 of the moveable wall 56 and urge the wall 56 downward toward its lower locking position, thereby placing the lock mechanism 46 in its locking state. During rotation of the spring 62 in the unlocking direction, the coils of the spring 62 engage the projection

74 and urge the wall 56 upward toward its upper unlocking position, thereby placing the lock mechanism 46 in its unlocking state.

The mechanical lock mechanism 42 is operable to selectively connect the handle 30 to the drive spindle 32, and in the illustrated form comprises a lock cylinder 76, a cam 78 that is operable to be rotated by the lock cylinder 76, and a lock plate 80 engaged with the cam 78 and the movable wall 56. As is typical of lock cylinders, the lock cylinder 76 generally includes a shell, a plug rotatably mounted in the shell, and a tumbler system operable to selectively prevent rotation of the plug relative to the shell. The plug of the lock cylinder 76 is coupled with the cam 78 such that upon insertion of a proper key into the plug, the key is operable to rotate the plug to thereby rotate the cam 78. One end of the cam 78 is coupled with the plug of the lock cylinder 76, and the opposite end of the cam 78 is engaged with the lock plate 80. For example, a projection 82 of the cam 78 may be received in a slot 84 of the lock plate 80. When the cam 78 is rotated, the projection 82 rides along the slot 84 and urges the lock plate 80 upward. The lock plate 80 is engaged with the movable wall 56 such that upward movement of the lock plate 80 drives the movable wall 56 upward to its unlocking position, thereby unlocking the trim assembly 20. Upon return of the cam 78 to its home position, the lock plate 80 returns to its lower home position, thereby permitting the wall 56 to return to its lower locking position.

As noted above, certain embodiments may omit the electromechanical lock mechanism 36. In such forms, the mechanical lock mechanism 42 may include the movable wall 56 and the coupler 60 to retain the unlocking functionality of the mechanical lock mechanism 46. Moreover, while a particular embodiment of the electromechanical lock mechanism 36 and a particular embodiment of the mechanical lock mechanism 42 are illustrated and described herein, it is to be appreciated that the electromechanical lock mechanism 36 and/or the mechanical lock mechanism 42 may take another form. As one example, the electromechanical lock mechanism 36 may be provided as another form of electromechanical lock mechanism operable to selectively couple the handle 30 with the drive spindle 32, or a form of electromechanical lock mechanism operable to selectively prevent rotation of the handle 30. As another example, the mechanical lock mechanism 42 may be provided as another form of mechanical lock mechanism operable to selectively couple the handle 30 with the drive spindle 32, or a form of mechanical lock mechanism operable to selectively prevent rotation of the handle 30. Such electromechanical and mechanical lock mechanisms are known in the art, and need not be described in detail herein.

The pushbar assembly 22 can further include a second cam assembly 51 that is configured to selectively couple the pushbar assembly 22 to the latch mechanism 24 and/or indirectly to the drive spindle 32. Moreover, activation of the pushbar assembly 22, such as in connection with an end user depressing the pushbar 26, can facilitate the second cam assembly 51 being displaced, such as rotated, away from a home position of the second cam assembly 51 that is associated with a position of the second cam assembly 51 when a latch bolt 87 (FIG. 4B) of the latch mechanism 24 is at an extended, or locked, position. Such displacement of the second cam assembly 51 can thus also be associated with displacing the latch bolt 87 from the extended, locked position to a retracted, or unlocked position. Additionally, such displacement of the second cam assembly 51 and/or the latch mechanism 24 can also facilitate the first cam assembly 50 being similarly displaced, such as, rotated, for a home position of the first cam assembly 51 that can also be associated with the latch bolt 87 being at the extended, or locked, position. Upon a release of the pushbar 26, or other stoppage of an activation of the push bar assembly 27, the latch mechanism 24 can be configured to at least attempt to partially drive the first and second cam assemblies 50, 51 back to their respective home positions.

Similar to the above-discussed first cam assembly 50, the second cam assembly 51 can utilize selective placement of one or more projections or notches in one or more mating slots or grooves so as to selectively provide a coupling that can translate a rotational force associated with an activation of the pushbar assembly 22 in connection with operation of at least the latch mechanism 24. The ability of such slots or grooves of the second cam assembly 51 to be received, or removed, from the mating slots or grooves can be at least partially dependent on attaining proper alignment between the projections/notches and the mating slots/grooves of the second cam assembly 51, including with respect to the first and second cam assemblies 50, 51 fully returning to their associated home positions, which, as discussed below, can be aided by the recentering adapter 100. Moreover, an inability of the first and second cam assemblies 50, 51 to return to their home positions can cause an misalignment of the one or more projections/notches with the mating slot(s)/groove(s) of the first and second cam assemblies 50, 51, respectively, that can interfere with the operation of the latch mechanism 24, including, for example, adversely impact, or prevent, the latch bolt 87 from fully reaching either or both the extended, or locked, position and the retracted, unlocked position of the latch bolt 87

Figure 4A:
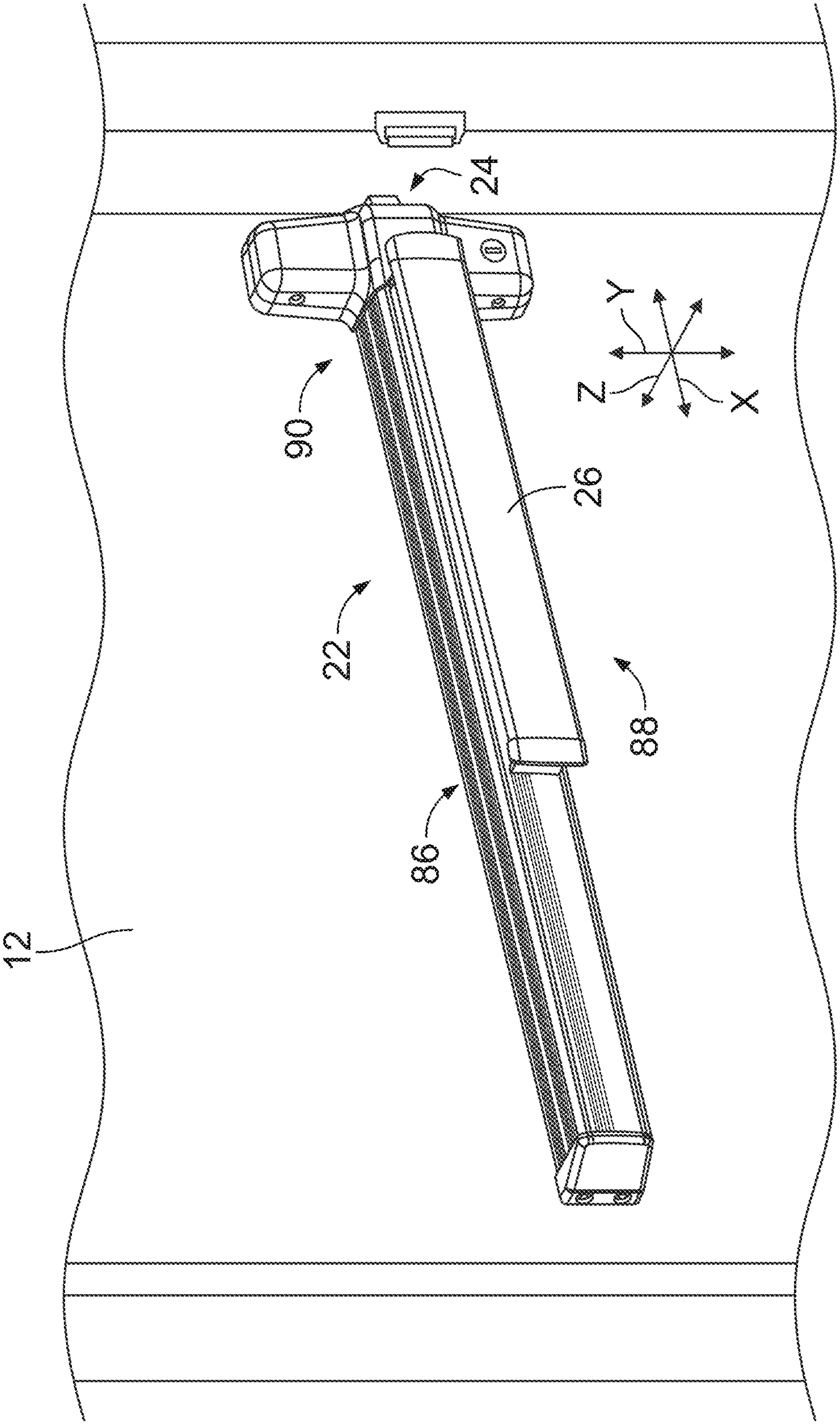
FIGS. 4A and 4B illustrate perspective views of portions of an exemplary pushbar assembly for the exit device assembly shown in FIG. 1.
Figure 4B:
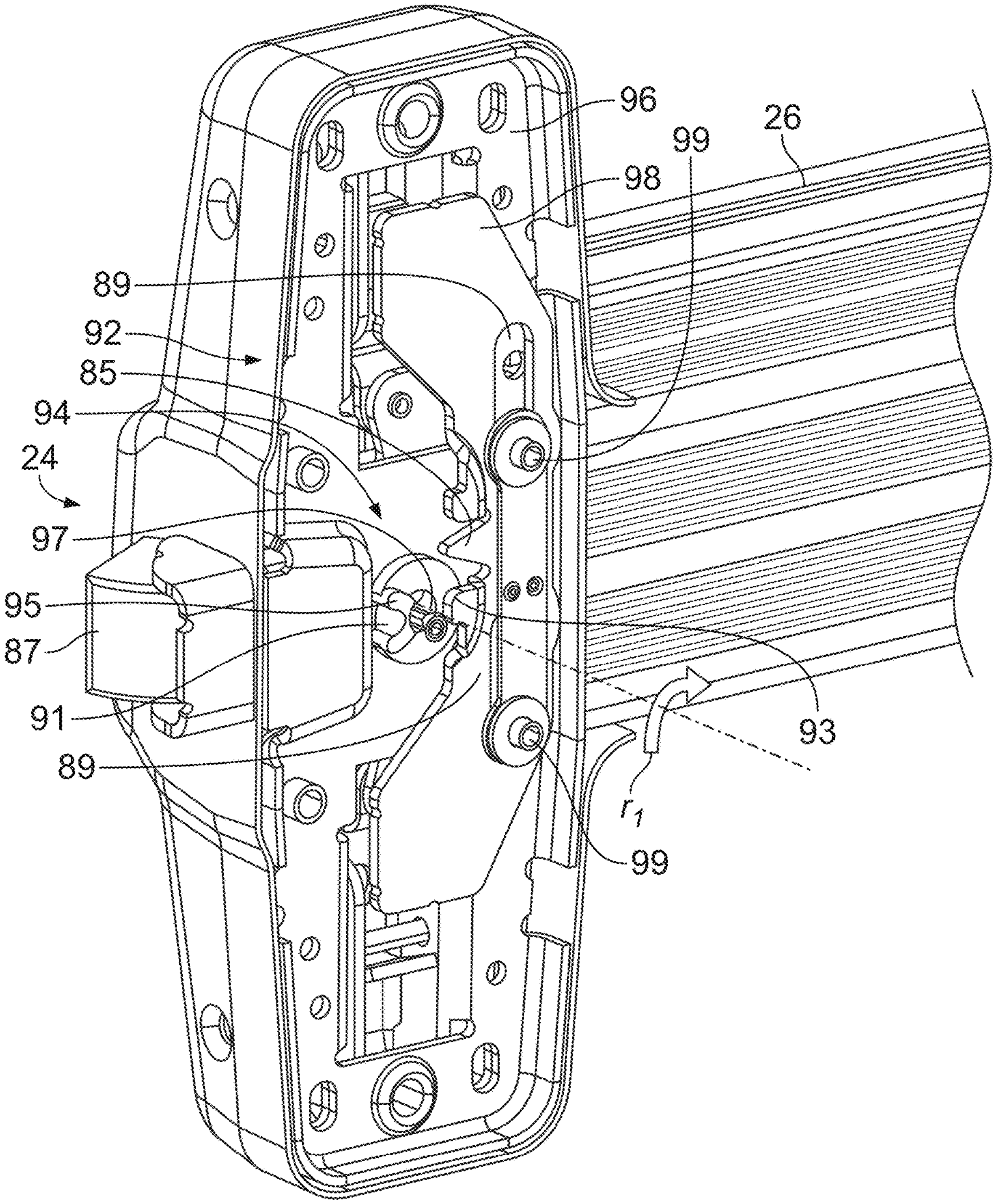

Referencing FIGS. 4A and 4B, the pushbar assembly 22 can generally include a mounting assembly 86, a drive assembly 88 movably mounted to the mounting assembly 86, a latch control assembly 90 operably coupled with the drive assembly 88, and an actuating device 92 operable to actuate the latch control assembly 90. In the illustrated form, the pushbar assembly 22 further includes the latch mechanism 24. The actuating device 92 can generally includes the second cam assembly 51, which in this example is illustrated as an actuator 94 that is rotatably mounted to the header plate 96 and a slide plate 98 slidably mounted to the header plate 96 via a pair of lugs 99. The actuator 94 includes an aperture 97 sized and shaped to receive a tailpiece (FIGS. 17 and 18) of the recentering adapter 100, and further includes a projection 95 defining a recess 91. The slide plate 98 generally includes a protrusion 93, a finger 85 positioned above the protrusion 93, and a pair of slots 89 that receive the lugs 99.

The actuating device 92 is configured to actuate the latch control assembly 90 in response to rotation of the actuator 94 in an actuator actuating direction ("$r_1$") clockwise in FIG. 4B). Upon such rotation of the actuator 94, the projection 95 engages the protrusion 93, thereby urging the slide plate 98 downward as the finger 85 enters the recess 91. The slide plate 98 is engaged with the latch control assembly 90 such that downward movement of the slide plate 98 drives the upper driver 236 downward (i.e., in its laterally inward actuating direction), thereby actuating the latch control assembly 90 and retracting the latch bolt 87.

While the actuating device 92 is operable to actuate the latch control assembly 90 when the actuator 94 is rotated in the actuator actuating direction ("$r_1$") (clockwise in FIG. 4B), the actuating device 92 may be inoperable to actuate the latch control assembly 90 when the actuator 94 is rotated in a second direction opposite the actuator actuating direction ("$r_1$"). In such forms, the second direction may be referred to as the actuator non-actuating direction. In the illustrated form, when the actuator 94 is rotated in the actuator non-actuating direction (counterclockwise in FIG. 4B), the projection 95 engages the protrusion 93 and urges the slide plate 98 upward. However, upward movement of the slide plate 98 is prevented, for example by engagement of the lugs 99 with the ends of the slots 259. As such, the illustrated actuating device 92 is operable to actuate the latch control assembly 90 only when the actuator 94 is rotated in the actuator actuating direction ("$r_1$"), and not when the actuator 94 is rotated in the opposite direction.

As noted above, when the handle 30 is operably connected with the drive spindle 32, the handle 30 is operable to rotate the drive spindle 32 in each of a first direction and a second direction. If the drive spindle 32 were rotationally coupled with the actuator 94, rotating the handle 30 in one direction would rotate the actuator 94 in the actuator actuating direction ("$r_1$"), while rotating the handle in the opposite direction would rotate the actuator 94 from the actuator home position in the actuator non-actuating direction. Yet, such coupling of the drive spindle 32 with the actuator 92, among other components of the exit device assembly 10, can enhance the level of resistance against at least the drive spindle 32 and actuator 92 returning to associated home positions when a user disengages from operation of the exit device 106. Thus, to the extent certain biasing bodies can be incorporated into the exit device 10 to return certain components to their respective home positions, such as, for example, returning the handle 30 to the locked position (FIG. 2), such biasing bodies may be insufficient to provide a sufficient biasing force to ensure that the latch mechanism 24 reaches a fully extended position 24. For example, as discussed above, failure of the drive spindle 32 and the actuator 92 to return to their respective home positions can adversely impact at least the operation of the corresponding first and second cam assemblies 50, 51, which can interfere with the operation of the latch mechanism 24. How, such biasing forces, if any, in other portions of the exit device assembly 10 can be enhanced by at least inclusion of a recentering adapter 100, as discussed herein.

Figure 5:
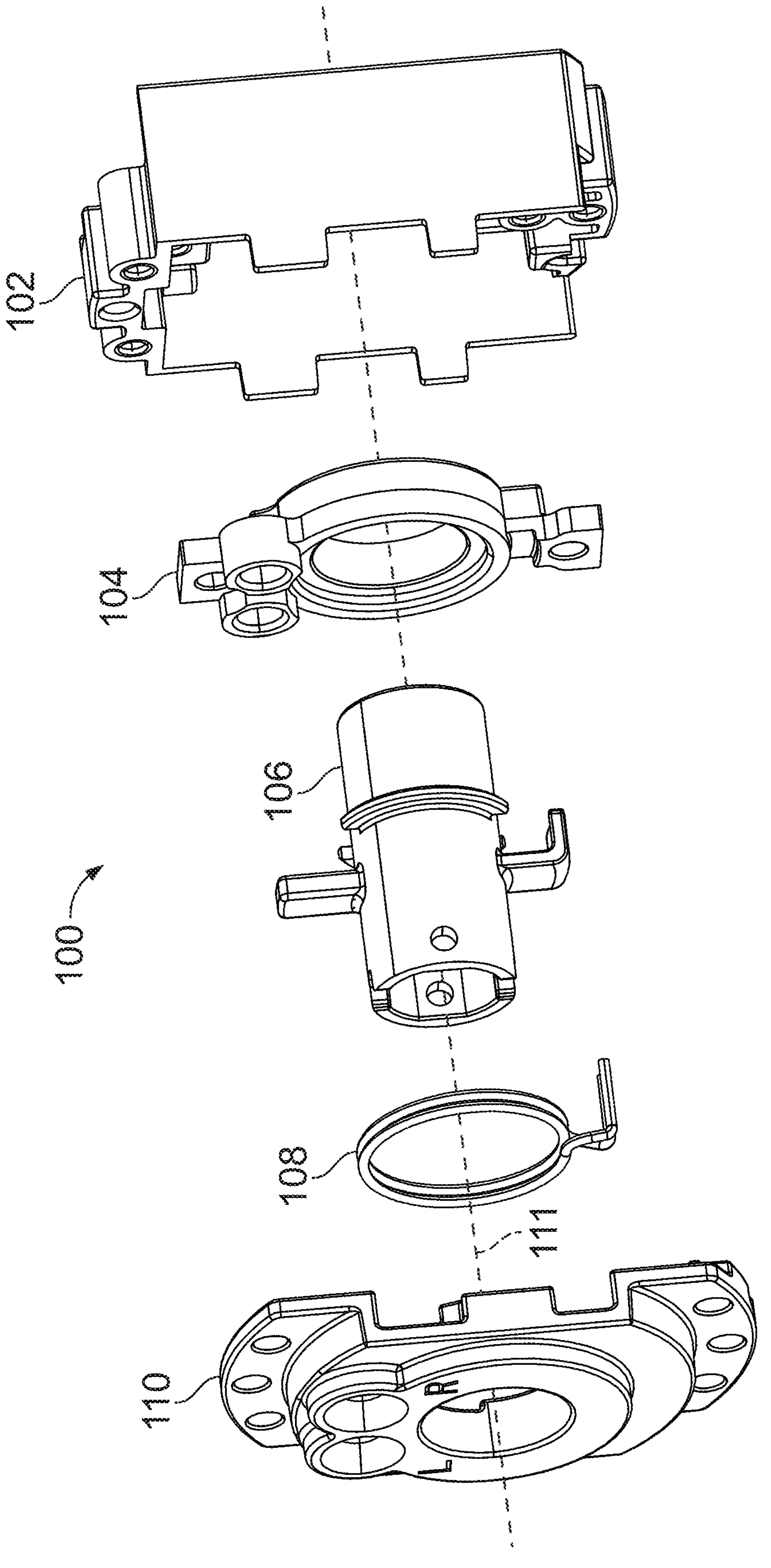
FIG. 5 illustrates an exploded view of an exemplary recentering adapter according to an illustrated embodiment of the subject disclosure.
Figure 6:
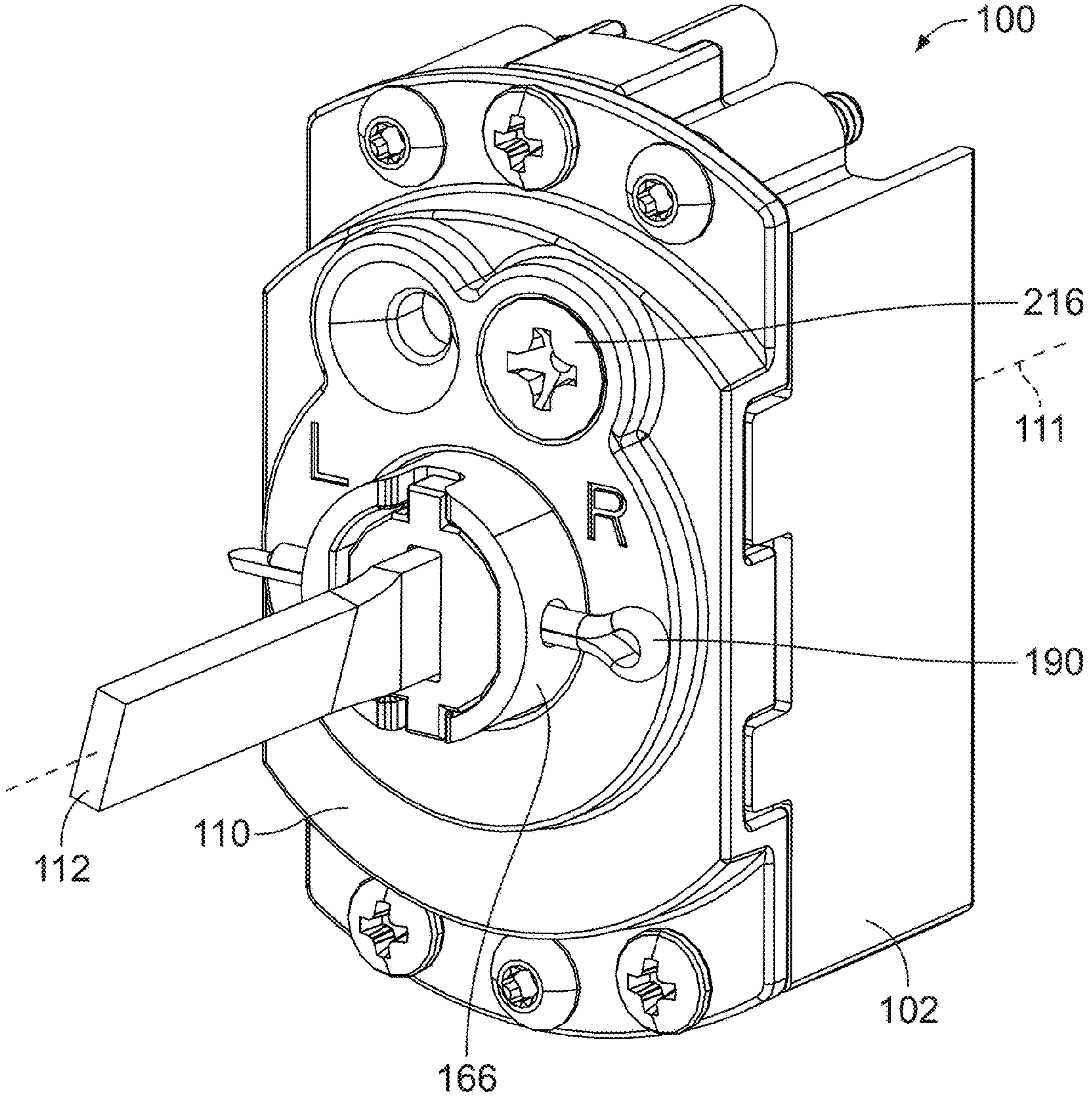
FIGS. 6 and 7 illustrate front and rear side perspective views, respectively, of the exemplary recentering adapter shown in FIG. 5.
Figure 7:
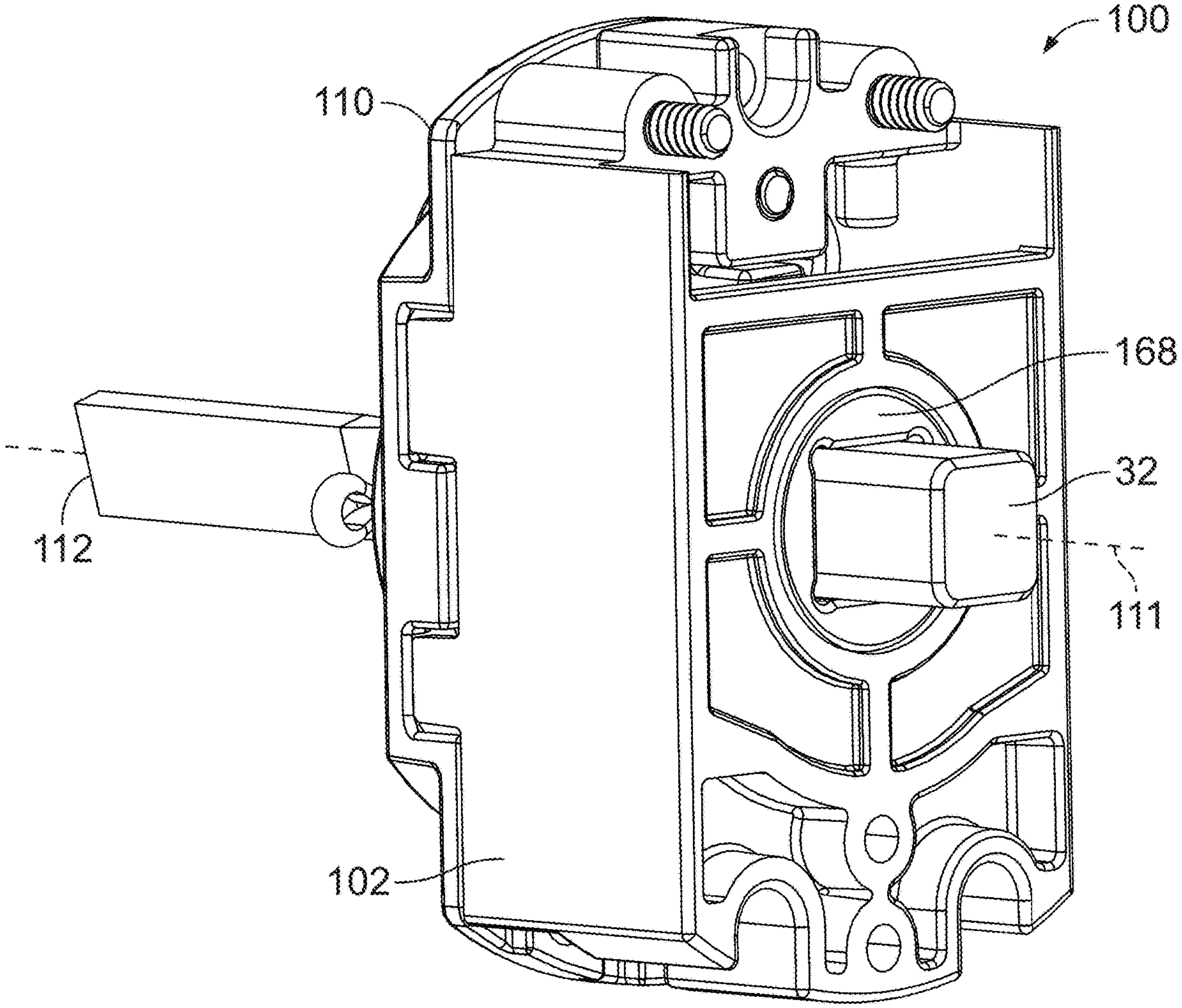
Figure 9:
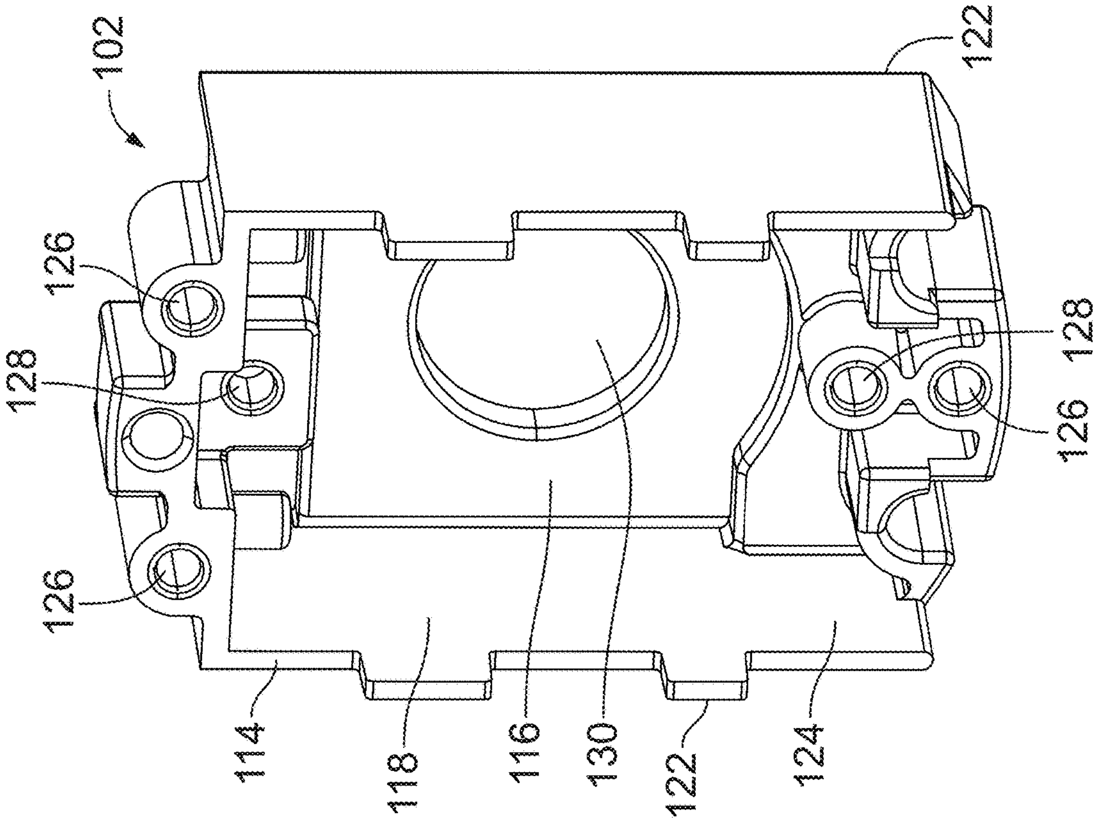
FIGS. 8 and 9 illustrate a front view and a front side perspective view, respectively of a housing for the recentering adapter.
Figure 8:
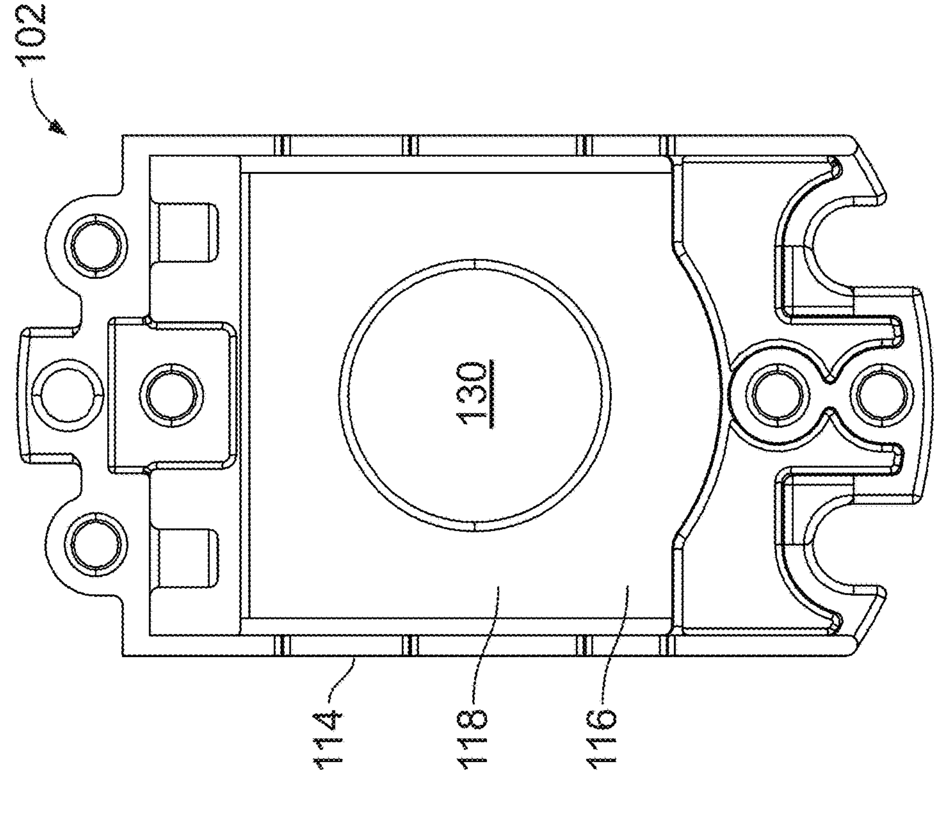

FIGS. 5-7 illustrate an exemplary embodiment of the recentering adapter 100 of the exit device assembly 10. The illustrated recentering adapter 100 is configured for mounting to the trim assembly 20, such as, for example, to a portion of the escutcheon plate 28, and to extend into at least a portion of the door preparation 18. As seen in at least FIG. 5, the recentering adapter 100 can include a housing 102, support plate 104, cam 106, biasing element 108, and a cover 110. As show, the recentering adapter 100 is configured for the cam 106 to be rotated relative to other portions of the recentering adapter 100 along a longitudinal central axis 111 of the recentering adapter 100.

The housing 102 can comprise one or more, if not a plurality of, sidewalls 114 that extend around at least a portion of a base wall 116 of the housing 102, the sidewalls 114 and base wall 116 generally defining an interior area 118 of the housing 102. The sidewalls 114 extend from a first end 120 to a second end 122 of the sidewalls 114, the first end 120 being adjacent to the base wall 116, and the second end 122 generally defining an inlet opening 124 to the interior area 118. The interior area 118 is configured to house at least a portion of the support plate 104, cam 106, and biasing element 108.

According to certain embodiments, the base wall 116 includes a plurality of first apertures 126 that are configured to receive one or more cover fasteners, such as, for example, screws or bolts, that secure the cover 110 to the housing 102 to the trim assembly 20 at a location about the inlet opening 124, as seen, for example, in at least FIG. 6. The housing 102 further includes a plurality of second apertures 128 positioned to receive one or more support plate fasteners that secure the support plate 104 to the housing 102. The base wall 116 also includes a first opening 130 configured to accommodate receipt of at least a portion of the cam 106, as well as passage of the drive spindle 32 in a manner in which an end of the drive spindle 32 can be received into, or otherwise be coupled to, a portion of the cam 106. The first opening 130 can be positioned such that the central axis 111 of the recentering adapter 100 extends through, or around, the center of the first opening 130. Additionally, according to certain embodiments, the recentering adapter 100 is configured for the base wall 116 to be positioned generally adjacent to, or otherwise generally facing, the escutcheon plate 28. Further, the housing 102 can be constructed from a variety of metallic and non-metallic materials, including, but not limited to, steel, aluminum, cast iron, fiberglass, and polyvinyl chloride (PVC), among other materials.

Figure 11:
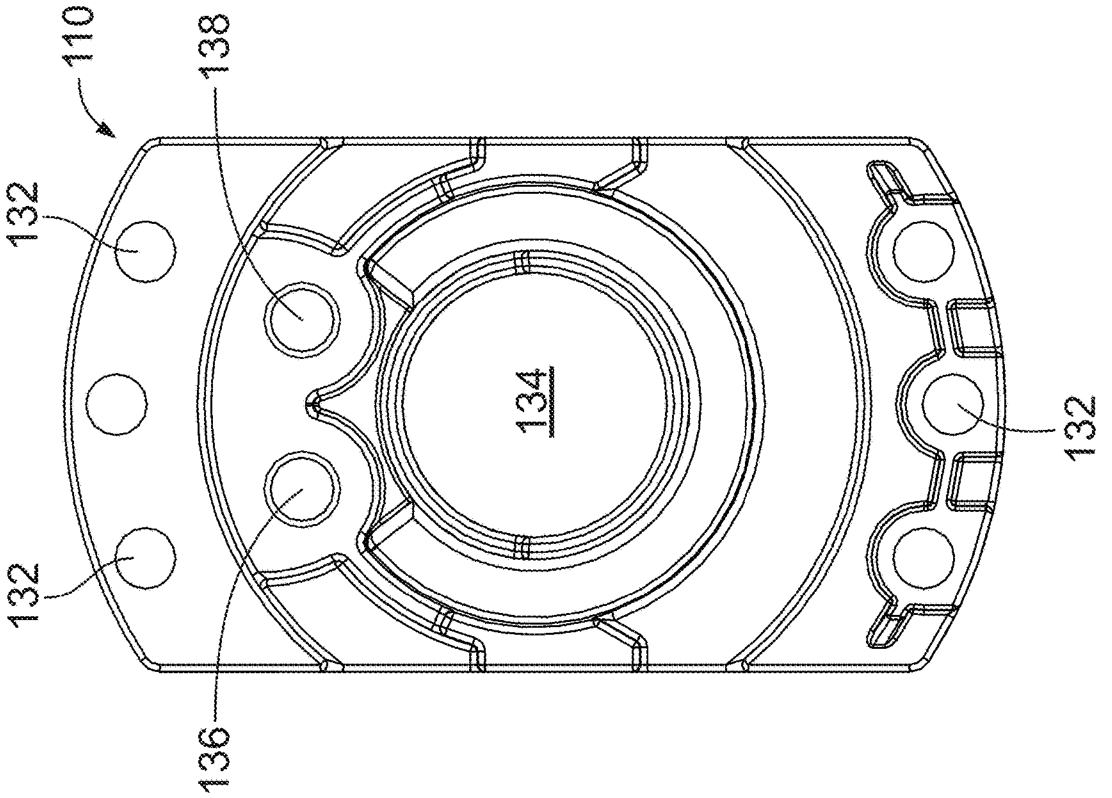
FIGS. 10 and 11 illustrate front and rear side views, respectively, of a cover plate for the recentering adapter.
Figure 10:
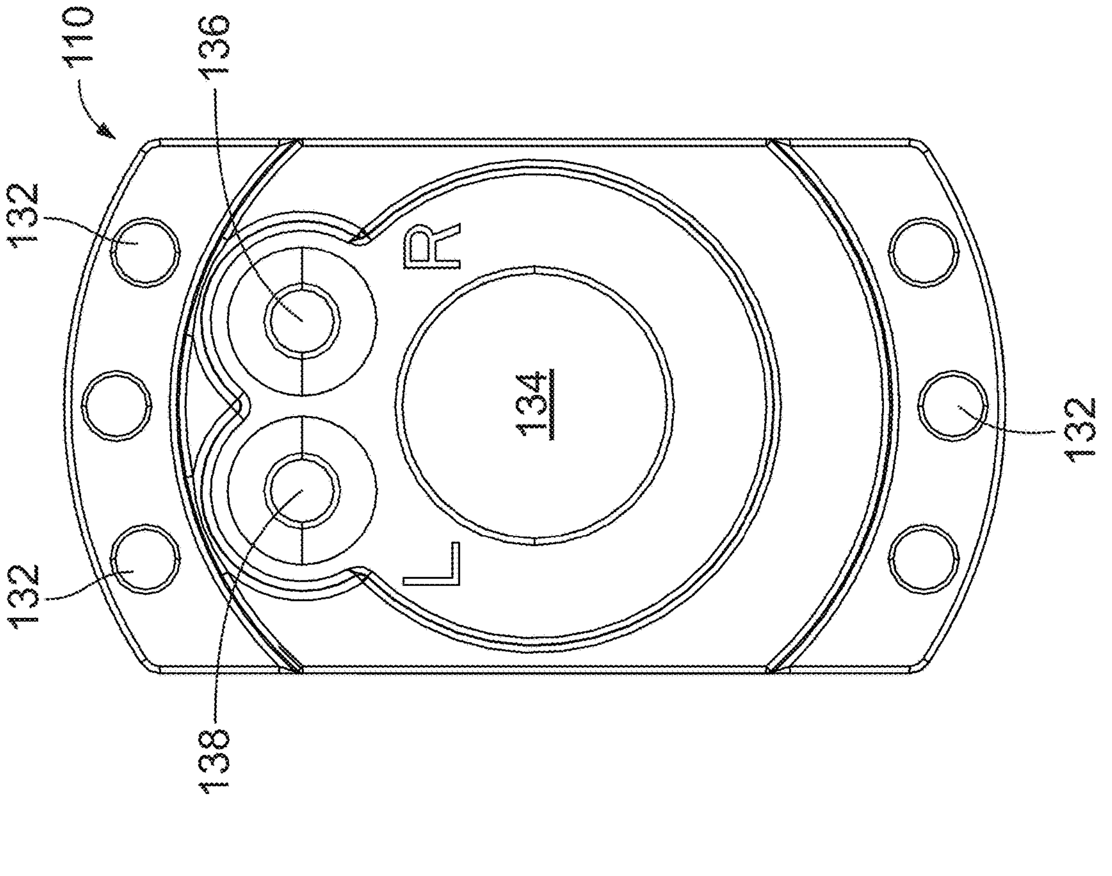

As seen in at least FIGS. 6, 10, and 11, the cover 110 is configured to be secured to the housing 102 at a location at which the cover 110 extends over, or across, the inlet opening 124. The cover 110 can have a variety of different shapes and configurations. For example, according to certain embodiments, the cover 110 can be generally rectangular in shape, and be generally planar and/or contoured so as to abut against at least a portion of the second ends 122 of the sidewalls 114 when the cover 110 is secured to the housing 102. Further, a case can be formed by at least the cover 110 being secured to the housing 102 that can have a thickness between the cover 110 and housing 102 sized to accommodate use of the recentering adapter 100 with a wide range of exit devices 10 and associated door sizes or thicknesses.

The cover 110 can also include a set of apertures 132 positioned to be aligned with the first set of apertures 126 of the housing 102 such that cover fasteners can extend through each set of apertures 126, 132, one or both of which can include an internal thread that mates an external thread of the cover fastener. The cover 110 also includes a second opening 134 that can be sized to accommodate passage of an end of the cam 106 and/or to receive entry of at least a portion of the tailpiece 112. The second opening 134 can be positioned such that the central axis 111 of the recentering adapter 100 extends through, or around, the center of the second opening 134. Thus, the second opening 134 can be generally aligned with the first opening 130 of the housing 102. As also seen in at least FIGS. 10 and 11, the cover 110 includes a first and second outer handing apertures 136, 138 that, as discussed below, can be utilized in connection with the support plate 104 in connection with controlling a handing of the trim assembly 20, and, moreover, the associated handle 30.

Figure 13:
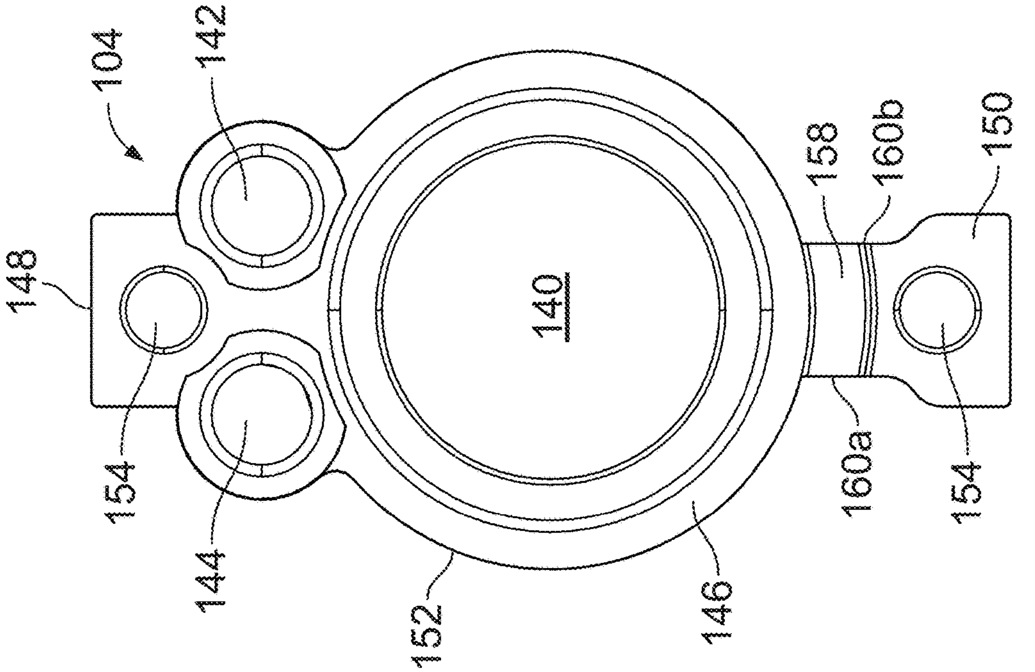
FIGS. 12 and 13 illustrate a front view and a front side perspective view, respectively, of a support plate for the recentering adapter.
Figure 12:
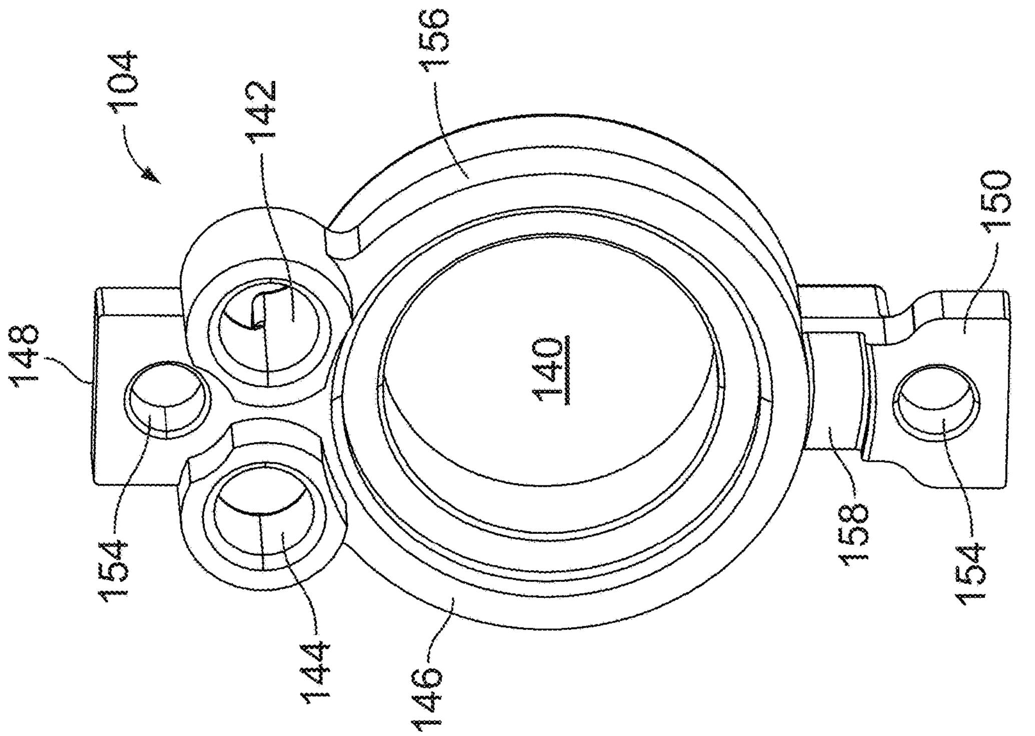

FIGS. 12 and 13 illustrate a front view and a front side perspective view, respectively, of a support plate 104 for the recentering adapter 100. The support plate 104 is configured to assist with guiding the rotational displacement of the cam 106. Additionally, the support plate 104 can provide an anchor for the biasing element 108, as discussed below. The support plate 104 can be constructed from materials similar to, or different than those mentioned above with respect to the housing 102. For example, according to certain embodiments, the housing 102, as well as other portions of the recentering adapter 100 can be constructed from steel, while the support plate 104 can be constructed from plastic.

As seen in at least FIGS. 12 and 13, the support plate 104 can include a ring body 146 that generally defines a support plate aperture 140, the support plate aperture 140 being sized to receive rotatable insertion of at least a portion of the cam 106. The support plate aperture 140 can be positioned such that the central axis 111 of the recentering adapter 100 extends through, or around, the center of the support plate aperture 140. Thus, when the recentering adapter 100 is assembled, the support plate aperture 140 can be generally aligned with the first opening 130 of the housing 102 and the second opening 134 of the cover 110. The support plate 104 can further include a pair of support plate apertures 154 position in opposing first and second protrusions 148, 150 that outwardly extend from the ring body 146 and that are configured to receive one or more support plate fasteners that can extend into the mating second apertures 128 of the housing 102. According to certain embodiments, either, or both, the second apertures 128 of the housing 102 and the support plate apertures 154 of the support plate 104 can include an internal thread that is configured to mate with an associated external thread of the support plate fasteners.

The support plate 104 can also include first and second inner handing apertures 142, 144 that, as discussed below, can be utilized in connection with the first and second outer handing apertures 136, 138 of the cover 110 for controlling the handing of the trim assembly 20, and, moreover, the associated handle 30. According to the illustrated embodiment, the first and second inner handing apertures 142, 144 are position at opposing sides of the first protrusion 148, and extend from an outer wall 152 of the ring body 146.

While the illustrated embodiments of the recentering adapter 100 depict the support plate 104 and the housing 102 as being separate components, according to other embodiments, the support plate 104 and housing 102 can be part of the same monolithic structure. Alternatively, the support plate 104 can be coupled to the housing 102 in a variety of other manners in addition to, or different than, the use of support plate fasteners, including, for example, via one or more welds, adhesives, or snap fits, among other manners of securely coupling the support plate 104 to the housing 102.

As seen in at least FIGS. 12 and 13, the second protrusion 150 can include a slot or groove 158 that extends between opposing sides 160*a*, 160*b* of the second protrusion 150 that can accommodate passage of at least a portion of the cam 106 as the cam 106 is rotatably displaced relative to at least the support plate 104. Thus, the groove 158 can generally extend along an arc or curvature that has an origin that is at, or intersects, the central axis 111 of recentering adapter 100. Further, the width of the support plate 108 between the sidewalls 160*a*, 160*b* that are at least adjacent to the groove 158 can be sized to be positioned in a portion of a gap 240 (FIG. 17) between legs 234*a*, 234*b* (FIG. 17) of the biasing element 108 to provide an anchor for the biasing element 108 that can assist in minimizing, if not preventing, rotational displacement of the biasing element 108 with the rotation of the cam 106, as discussed below.

Figure 15:
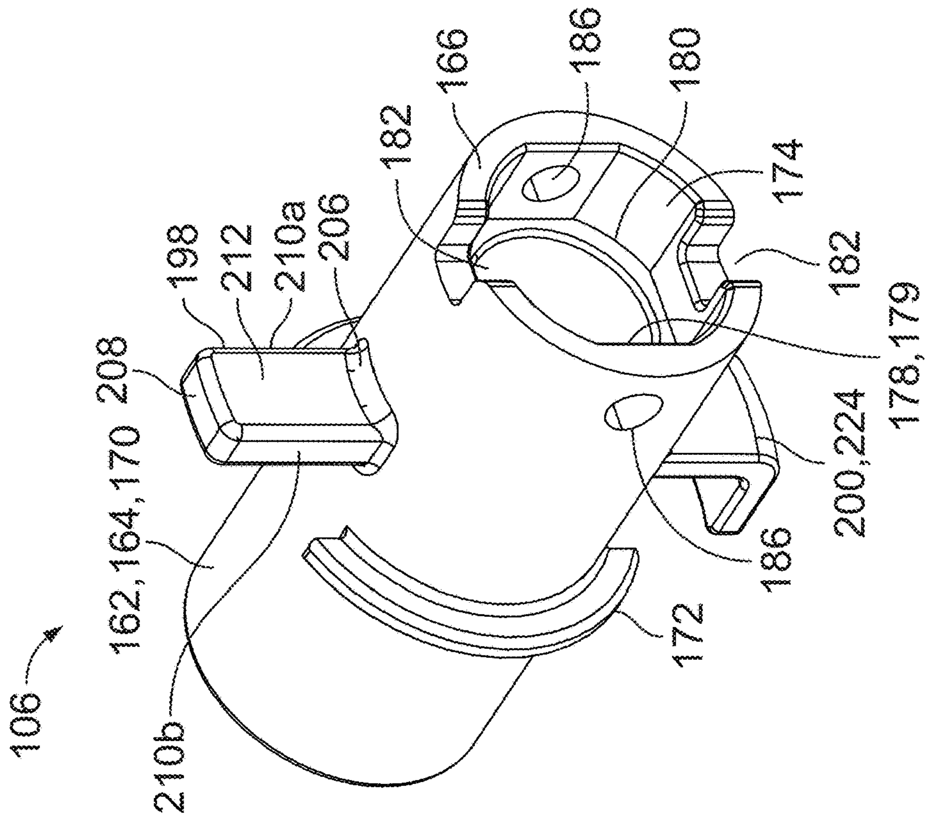
FIG. 15 illustrates a top side first end perspective view of the exemplary cam of the recentering adapter.
Figure 14:
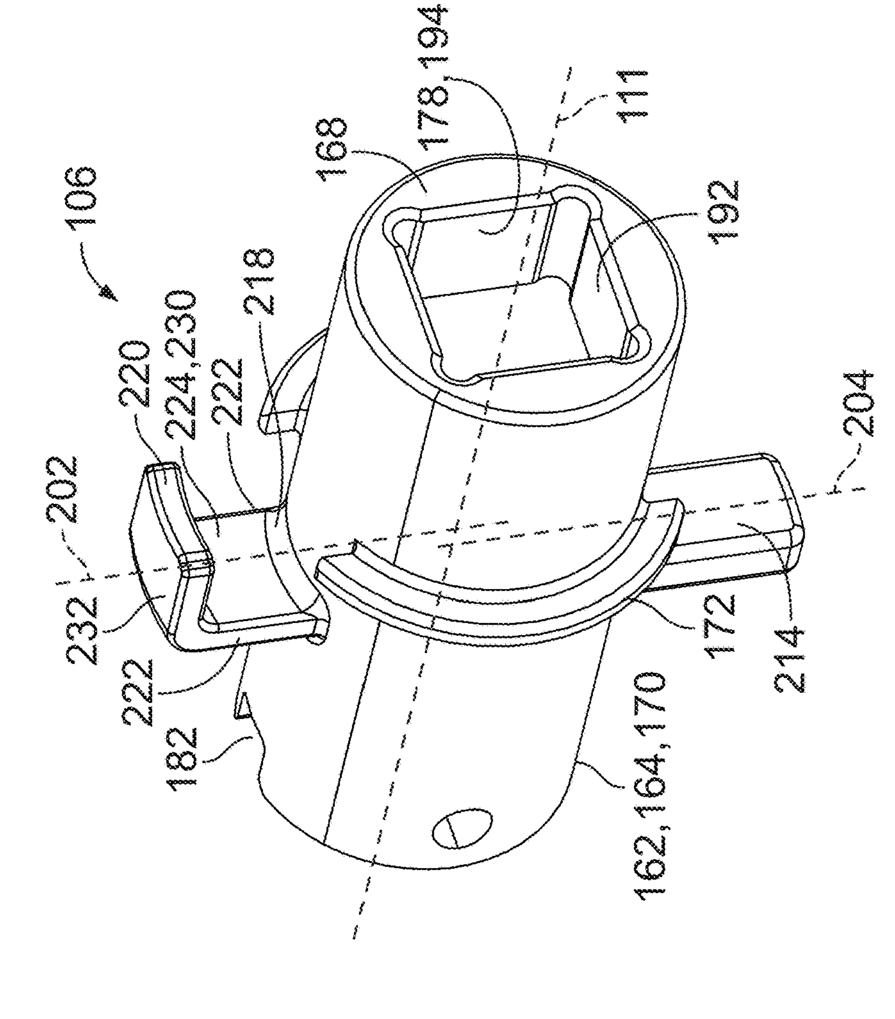
FIG. 14 illustrates a bottom side second end perspective view of an exemplary cam of the recentering adapter.

FIGS. 14 and 15 illustrate perspective views of an exemplary cam 106 of the recentering adapter 100. The cam 106 includes a cam body 162 having a cam wall 164 that extends between a first end 166 and a second end 168 of the cam 106. According to the illustrated embodiment, an outer surface 170 of the cam wall 164 has a generally cylindrical configuration that generally extends the length of the cam wall 164. At least a portion of an outer surface 170 of the cam wall 164 positioned between the second end 168 of the cam 106 and a guide wall 172 of the cam body 162 can be configured to be received within the support plate opening 140 of the support plate 104 in a manner in which the support plate 104 can support the cam 106 and accommodate rotational displacement of cam body 162 within the support plate opening 140.

At least a portion of the outer surface 170 of the cam wall 164 at the first end 166 of the cam 106 can be configured for rotatable insertion within the first opening 130 of the housing 102, while at least a portion of the outer surface 170 of the cam wall 164 at the second end 168 of the cam 106 is configured for rotatable insertion within the second opening 134 of the cover 110. According to certain embodiments, the first end 166 can have a size, such as, for example, a diameter, that corresponds to a similar size of the first opening 130 of the housing 102 such that the first opening 130 can assist in supporting and guiding the rotational displacement of the cam body 162, and thus the cam 106. Similarly, the second end 168 can have a size, such as, for example, a diameter, that corresponds to a similar size of the second opening 134 of the cover 110 such that the second opening 134 can also assist in supporting and guiding the rotational displacement of the cam body 162, and thus the cam 106. Additionally, the second opening 134 can have a size, such as, for example, diameter, similar to the support plate opening 140 of the support plate 104.

The first end 166 of the cam 106 can include a first aperture 174 that inwardly extends into the cam body 162 in a direction that is generally parallel to the central axis 111, and which is configured to matingly receive a portion of the tailpiece 112 in a manner that can assist in securely couple the tailpiece 112 to the cam 106. For example, according to the illustrated embodiment, an inner surface 178 of the cam wall 164 can at least partially define a first aperture 174 that can be configured to matingly receive a collar portion 176 (FIG. 17) of the tailpiece 112. According to such an embodiment, the inner surface 178 of the cam wall 164 at the first end 166 can provide a plurality of first sidewalls 179 that are configured to generally define a shape of the first aperture 174 that generally conforms to an outer perimeter shape or profile of the collar portion 176 of the tailpiece 112. Thus, in this example, as the collar portion 176 of the illustrated tailpiece 112 has a generally octagonal shape, the plurality of first sidewalls 179 can similarly be arranged to provide the first aperture 174 with a mating octagonal shape. A rear wall 180 can also be positioned adjacent to the first aperture 174 and within the cam body 162 that can limit the distance that the collar portion 176 can be inserted into the first aperture 174.

As seen in the illustrated embodiment, the cam wall 164 can further include a pair of slots 182 that outwardly extend from the first aperture 174 in opposing directions that are generally orthogonal to the central axis 111, and that are configured to each receive a corresponding protrusion 184 (FIG. 17) that extends from the collar portion 176 of the tailpiece 112. The engagement between the slots 182 and the protrusions 184 can assist in the transfer of rotational forces between the tailpiece 112, and thus the cam 106. While a pair of slots 182 are illustrated in at least FIG. 14, the number and orientation of slots 182 and mating protrusions 184 can vary. The cam wall 164 can also include one or more orifices 186 that extend through the outer and inners surfaces 170, 178 of the cam body 162 and are communication with the first aperture 174. The orifices 186 can be positioned to align with similar orifices 188 (FIG. 17) that extend through the collar portion 176 and/or shank portion 196 (FIG. 17) of the tailpiece 112, the orifices 186, 188 being configured to receive insertion of a mechanical fastener 190 (FIG. 6), such as, for example, a pin, that can at least assist in retaining an engagement between the cam 106 and the tailpiece 112.

A seen in FIG. 15, the inner surface 178 of the cam wall 164 at the second end 168 of the cam 106 can define a second aperture 192. According to certain embodiments, the second aperture 192 can be generally aligned along the central axis 111. Further, the second aperture 192 is configured to receive mating insertion of the drive spindle 32. Accordingly, the inner surface 178 at the second end 168 can be configured to generally conform to the outer shape or profile of at least the portion of the drive spindle 32 that is to be received in the second aperture 192. Thus, according to embodiments in which the portion of the drive spindle 32 that is to be positioned within the second aperture 192 has a non-round outer profile, such as, for example, a square or rectangular shaped outer profile, among other shapes, the inner surface 178 at the second end 168 of the cam 106 can have a second plurality of sidewalls 194 that can generally define a similar, mating shape, for the second aperture 192. Additionally, the second aperture 192 can be communication with the first aperture 174 along the cam body 162, such as, for example, via the inner surface 178 providing a generally hollow opening therebetween that is configured to accommodate placement of at least a shank portion 196 of the tailpiece 112 that extends through the collar portion 176 of the tailpiece 112.

The guide wall 172 can outwardly extend from the outer surface 170 of the cam wall 164, and be configured to engage an outer surface of the support plate 104. Moreover, the guide wall 172 is positioned along the cam wall 164 at a location that at least attempts to control a location within the recentering adapter 100 at which the cam body 162 is to be positioned in a longitudinal direction that is generally parallel of the central axis 111. Such positioning of the guide wall 172 can further control the extent the first and second ends 166, 168 extend, or do not extend, out of the case formed by the cover 110 being secured to the housing 102 when the recentering adapter 100 is assembled. For example, as seen by at least FIG. 5, the guide wall 172 can be positioned at a location along the cam body 162 that can, when the recentering adapter 100 is assembled, result in the first end 166 of the cam 106 extending outside of the housing 102 or case by a distance that results in the orifices 186, 188 in the cam 106 and collar portion 176/shank portion 196 being accessible from outside of the housing 102 or case. Such accessibility to the orifices 186, 188 can accommodate the placement of the fastener 190, such as, for example, a pin, through the orifices 186, 188, as seen in FIG. 5. Further, as seen in FIG. 6, such positioning of the guide wall 172 can assist with the second end 168 of the cam 106 being positioned in the second opening 134 of the cover 110 but not protruding outside of the cover 110 or case.

The guide wall 172 can have a variety of shapes and configurations. For example, in the illustrated embodiment, the guide wall 172 can comprise a plurality of ring-shaped segments positioned about the outer surface 170 in a non-continuous configuration. Alternatively, the guide wall 172 can provide a continuous ring about the outer surface 170.

The cam 106 can further include a first arm 198 and a second arm 200 that outwardly extend from the cam wall 164 in opposing directions. Moreover, as generally seen in at least FIG. 14, the first arm 198 extends along a first arm axis 202 in a direction that is generally orthogonal to the longitudinally extending central axis 111. Similarly, the second arm 200 extends along a second arm access 204 that is also generally orthogonal to the longitudinally extending central axis 111. According to certain embodiments, the first arm axis 202 can be generally parallel to the second arm axis 204. Additionally, as seen in FIG. 14, according to certain embodiments, the first arm axis 202 can be linearly offset from the second arm axis 204 in a direction that is generally parallel to the central axis 111 toward either one of the first or second ends 166, 168 of the cam 106. However, according to other embodiments, the first axis 202 can be linearly aligned, and may also generally coincide, with the second arm axis 204. Additionally, as further seen in at least FIG. 14, in certain embodiments, the first and second arms 198, 200 can extend from the cam wall 164 at a location between the first end 166 of the cam 106 and the guide wall 172.

As seen in FIGS. 14 and 15, the first arm 198 can extend between an inner end 206 that is adjacent to the cam wall 164 and an outer end 208, as well as between opposing sidewalls 210*a*, 210*b*. Additionally, the first arm 198 can include a front wall 212 and a rear wall 214. While the first arm 198 can have a variety of different shapes and configurations, according to certain embodiments, the first arm 198 can have a generally rectangular cross-sectional shape. Additionally, the distance that the first arm 198 extends between the inner end 206 and the outer end 208 can be sized such that the first arm 198 can engage a removable handing body 216 (FIGS. 19 and 20) in a manner that can assist in setting a handling of the recentering adapter 100 and/or handle 30, and, moreover, control a direction of rotational displacement of at least the cam 106 from a home, or locked, position, as discussed below.

As also seen in FIGS. 14 and 15, the second arm 200 can extend between an inner end 218 that is adjacent to the cam wall 164 and an outer end 220, as well as between opposing sidewalls 222. Additionally, the second arm 200 can include a front wall 224 and a rear wall 226. While the second arm 200 can have a variety of different shapes and configurations, according to certain embodiments, the second arm 200 can have a generally "L" shape. Thus, for example, the second arm 200 can include a base portion 230 and a leg portion 232, the base portion 230 extending in a first direction from the inner end 218 along the second arm axis 204 to the base portion 230, or a union or transition that joins the base portion 230 to the leg portion 232. The leg portion 232 can then extend in a second direction to the outer end 220, the second direction being non-parallel, and possibly generally orthogonal, to the first direction. Thus, according to certain embodiments, the base portion 230 can be generally perpendicular to the leg portion 232, wherein the second direction in which the leg portion 232 extends is generally parallel to the longitudinal direction of the central access 111. Further, the leg portion 232 can have a length in the longitudinal direction that is sized to accommodate an engagement of the sidewalls 222 along the leg portion 232 between, if not against, a pair of opposing legs 234*a*, 234*b* of the biasing clement 108. Moreover, the leg portion 232 can be engaged with the legs 234*a*, 234*b* of the biasing element 108 in a manner that can bias at least the cam 106 to a home, or locked, position, as discussed below.

Figure 16:
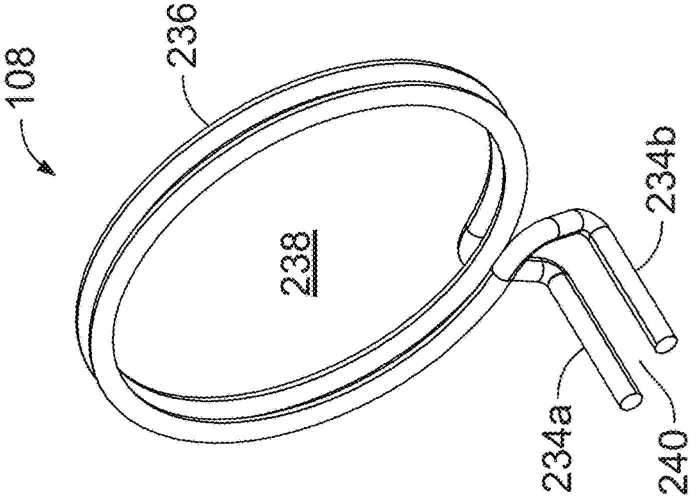
FIG. 16 illustrates a rear side view of a biasing element for the recentering adapter.

Referencing FIG. 16, the biasing element 108 can include an element ring body 236 that generally defines an orifice 238 of the biasing element 108. The orifice 238 can be sized, including, for example, have a diameter, that is similar to, if not larger, then a corresponding size, including diameter, of the cam body 162 of the cam 106 at least at a location at which the biasing clement 108 is to be positioned about. For example, according to certain embodiments, the orifice 238 can have a size that can accommodate placement of the element ring body 236 about the cam 106 at a location between the first end 166 and the front wall 212, 224 of the first arm 198 and/or the second arm 200, as shown, for example, by at least FIGS. 19 and 20. Additionally, the legs

234a, 234b can extend in a direction that is generally parallel to the leg portion 232 of the second arm 200 such that the legs 234a, 234b are positioned adjacent to, and may abut, the sidewalls 222 of the second arm 200 along the leg portion 232. Moreover, the legs 234a, 234b can generally define a gap 240 between the legs 234a, 234b that is size receive placement of the leg portion 232 of the second arm 200 as well as a portion of the support plate 108, as discussed above.

Figure 17:
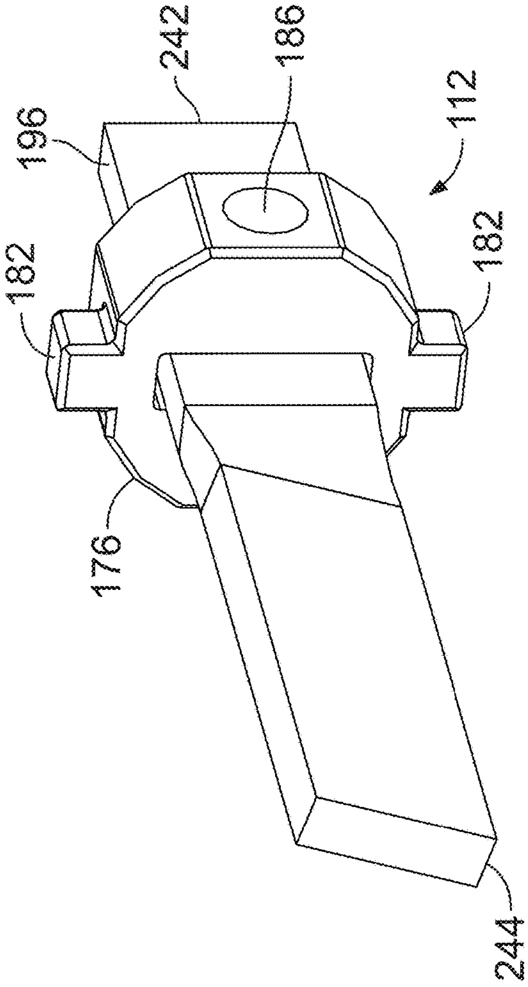
FIGS. 17 and 18 illustrate perspective views of a tail assembly configured for coupling to the cam of the recentering adapter.
Figure 18:
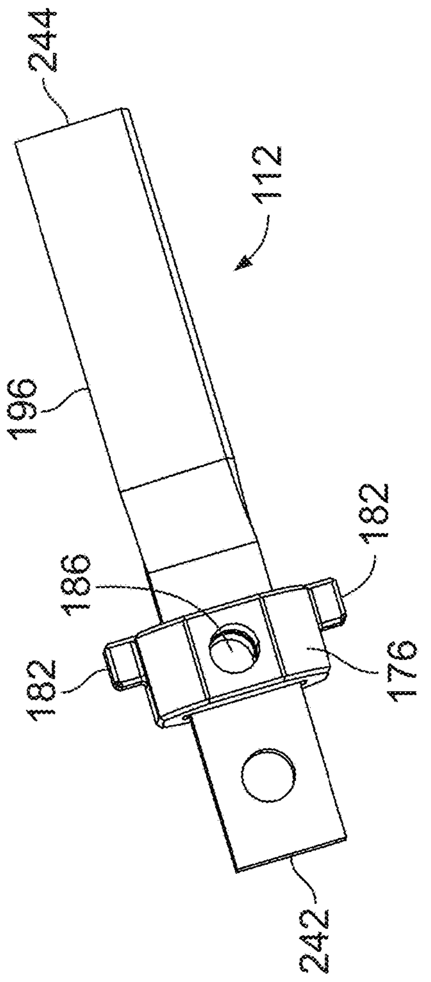

FIGS. 17 and 18 illustrate an exemplary embodiment of the tailpiece 112 in which the tailpiece 122 is a twisted tailpiece. According to such an embodiment, the tailpiece 112 has a first end portion 242 that extends into the recentering adapter 100, such as, for example, an opening defined by the inner surface 178 at least when the collar portion 176 is positioned in the first aperture 174. The tailpiece 760 also includes an opposite second end portion 244 that is rotationally offset relative to the first end portion 242 by an offset angle, such as, for example, an offset angle of around 1 degree) (°) to about 30°, and more particularly, about 11°, among other angles.

As generally indicated by at least FIG. 5, when the recentering adapter 100 is assembled, the support plate 104 can be secured to the housing 102 via one or more support plate fasteners that extend through a support plate apertures 154 in the support plate 104 and a corresponding second aperture 128 of the housing 102, as previously discussed. The cam 106 can then be positioned to extend through the support plate opening 140 of the support plate 104 and at least into, or adjacent to, the first opening 130 of the housing 102. Additionally, as previously discussed, the biasing element 108 can be positioned about the cam 106 such that the legs 234a, 234b extend generally about the leg portion 232 of the second arm 200 of the cam 106. Additionally, a portion of the legs 234a, 234b can be positioned adjacent to the support plate 108 such that a portion of the support plate 108 between the sidewalls 160a, 160b on opposing sides of the groove 158 are positioned in the gap 240 between the legs 234a, 234b. The cover 110 can then be secured to the housing 102, thereby encasing the support plate 104, at least a portion of the cam 106, and the biasing element 108 within the housing 102. Additionally, as previously discussed, with the cover 110 secured to the housing 102, such as, for example, via one or more fasteners that extend through each set of apertures 126, 132, the second end 168 of the cam 106 can extend through the second opening 134 of the cover 110.

With the cover 110 secured to the housing 102, the first outer handing aperture 136 of the cover 110 can be generally aligned with the first inner handing aperture 142 of the support plate 104, and the second outer handing aperture 138 of the cover 110 can be generally aligned with the second inner handing aperture 144 of the support plate 104. The handing body 216 can then be selectively positioned in one pair of the first outer and inner handing apertures 136, 142 (generally referred to herein as the first aperture pair) or the second outer and inner handing apertures 138, 144 (generally referred to herein as the second aperture pair). As previously mentioned, at least one aperture 136, 138, 142, 144 of each of the first aperture pair (e.g., apertures 136, 142) and the second aperture pair (e.g., apertures 138, 144) can be configured, including having an internal thread, to securely matingly engage at least a portion of the handing body 216, including, for example, engage an external thread of the handing body 216 in a manner that can secure the position of the handing body 216 relative to the other portions of the recentering adapter 100.

Figure 20:
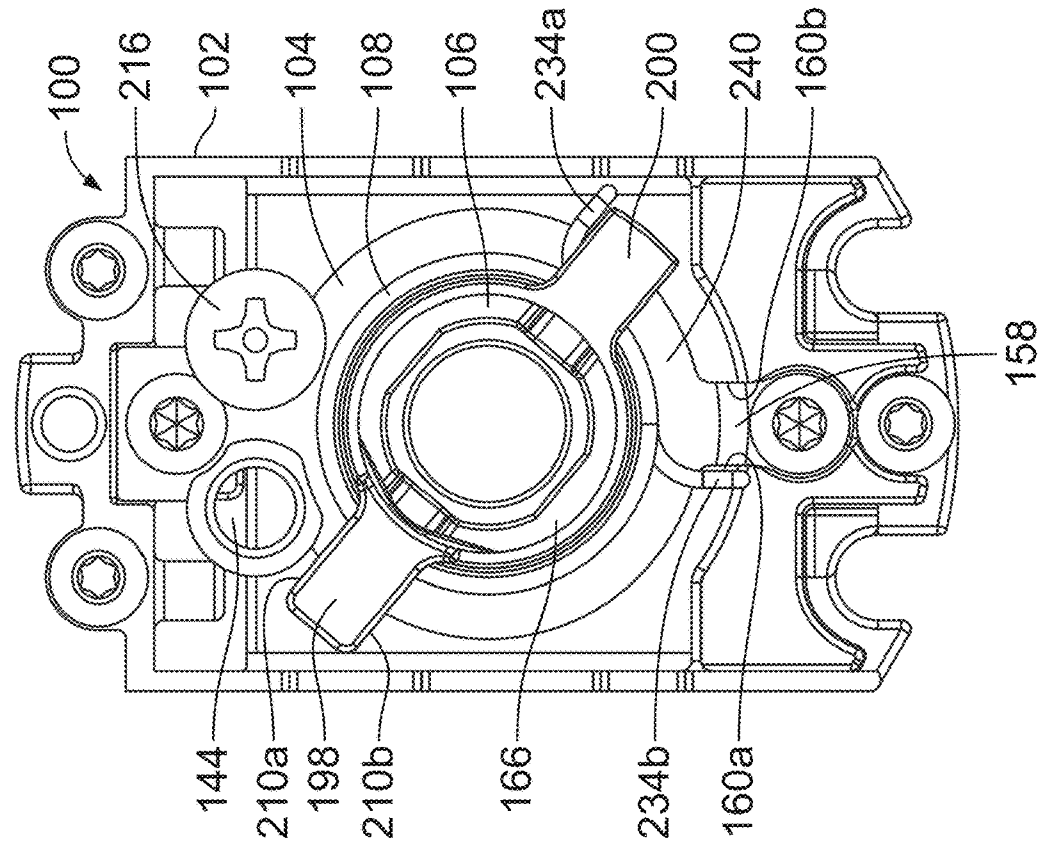
FIG. 20 illustrates a front view of a portion of the recentering adapter in which the cam has been rotatably displaced away from the home position.
Figure 19:
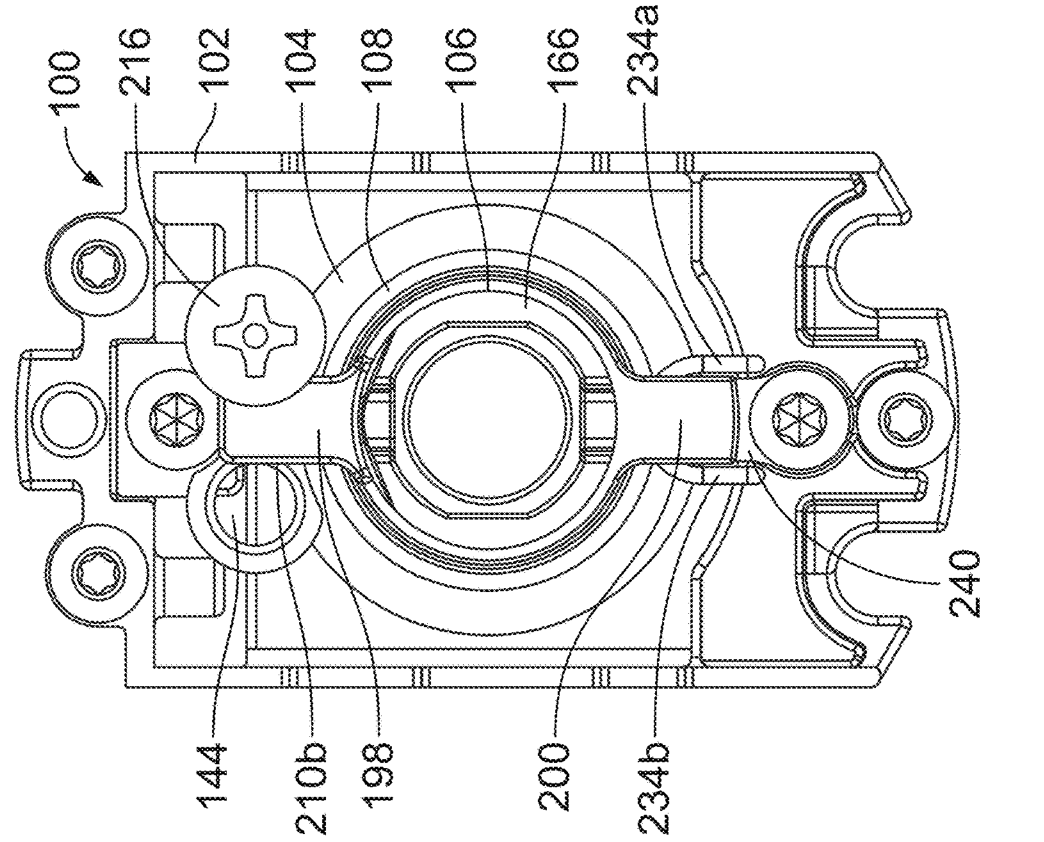
FIG. 19 illustrates a front view of a portion of the recentering adapter in which the cam is at a home position.

The first aperture pair (e.g., apertures 136, 142) and the second aperture pair (e.g., aperture pair 138, 144) are positioned such that, when the handing body 216 is positioned therein, the handing body 216 extends through a location within the interior area 118 of the housing 102 that is adjacent to the first arm 198 of the cam 106 such that the handing body 216 provides a barrier that prevents rotation of the cam 106 in one direction when the cam 106 is being displaced away from the home, or locked, position of the cam 106. For example, FIGS. 19 and 20 generally correspond to a scenario in which, if the cover 110 were not removed, the handing body 216 is, or would, be positioned in the first aperture pair, and, more specifically, first outer and inner handing apertures 136, 142. As seen, the handing body 216 is at a location adjacent to a sidewall 210a of the first arm 198 that prevents the first arm 198 rotating from the home, or locked, position (FIG. 19) in a first, clockwise direction. However, such positioning of the handing body 216 in this example does not preclude rotation of the cam 106 from the home, or locked, position in a second, counterclockwise direction. As the cam 106 is directly or indirectly coupled to the handle 30 via at least the drive spindle 32, such as, for example, by the drive spindle 32 being received in the second aperture 192 of the cam 106, by limiting the direction at which the cam 106 can be rotated from the home position via use of the handing body 216 can accordingly limit the direction a user can displace the handle 30 from a corresponding home, or locked, position (FIG. 2) of the handle to an unlocked position. Conversely, as generally indicated by FIGS. 19 and 20, when the handing body 216 is positioned in the second outer and inner handing apertures 138, 144, the handing body 216 is adjacent to a sidewall 210b of the first arm 198 that is opposite to the sidewall 210a that the handing body 216 was adjacent when the handing body 216 was secured to first outer and inner handing apertures 136, 142. Thus, by the handing body 216 being secured to the second outer and inner handing apertures 138, 144, the handing body 216 can be positioned to prevent rotation in of the cam 106 from the home, or locked, position in the second, counterclockwise direction, but does not interfere with rotation of the cam 106 from the home position in the first, clockwise direction. Thus, by placing the handing body 216 in the second outer and inner handing apertures 138, 144, the handing body 216 can again be used to control the direction the handle 30 can be displaced when the handle 30 is to move from the locked position to the unlocked position.

As indicated above, the selection of which of the first outer and inner handing apertures 136, 142 or the second outer and inner handing apertures 138, 144 to position the handing body 216 can control the direction at which the handle 30 can be displaced from the locked position to the unlocked position, and thus be used for setting the handing of the trim assembly 20. Further, the configuration of the recentering adapter 100 facilitates the case at which such handing of the trim assembly 20 can be set, and, if desired, adjusted via use of the recentering adapter 100. For example, as the handing body 216 extends through one of the first and second outer handing apertures 136, 138 in the cover 110, an installer can access, install, and/or adjust the positioning of the handing body 216 from outside of, and without disassembling, the recentering adapter 100. For example, as seen in at least FIG. 6, the recentering adapter 100 is configured such that a head of the handing body 216 is accessible from outside of the recentering adapter 100, and thus can be accessed by a tool, including, in this example, a Philips head screwdriver without disassembling any other portion of the recentering adapter 100. Additionally, as indicated by at least FIGS. 6 and 10, an outer surface of the cover 110 can further include indicia (e.g. "R" and "L") that can indicate if the placement of the handing body 216 in the corresponding first or second outer handing apertures 136, 138, and thus the associated first or second inner handing apertures 142, 144, corresponds to either right handed ("R") or left handed ("L") handing for the cam 106, and thus the handle 30.

The engagement between at least the second arm 200, and, moreover, the leg portion 232, with one or both of the legs 234*a*, 234*b* can also assist in providing a force that biases the cam 106 to the home position, as seen in FIG. 19. Such biasing forces can also be used to bias, or supplement other biasing forces, to similarly bias the drive spindle 32 and the tailpiece 112 to each of their respective home positions. As previously mentioned, with the recentering adapter 100 assembled, the leg portion 232 of the second arm 200 of the cam 106 and a portion of the support plate 104 between the opposing sidewalls 160*a*, 160*b* of the support plate 104 can be positioned within at least a portion of the gap 240 between the legs 234*a*, 234*b* of the biasing element 108. According to the illustrated embodiment in which the handing body 216 is positioned in the first outer and inner handing apertures 136, 142, as a rotational force, such as a force associated with displacing the handle 30 from the locked position, is transmitted from the handle 30 to the cam 106 via at least the drive spindle 32, the cam 106 can be rotated away from the home position (FIG. 19) in the second, counterclockwise direction. Such rotational displacement of the cam 106 can cause the second arm 200 to exert a force against a first leg 234*a* of the biasing element 108, while the second leg 234*b* of the biasing element 106 remains engaged with, or anchored by, an adjacent sidewall 160*a* of the support plate 108. Moreover, as the second leg 234*b* of the biasing element 106 remains at a relatively static position while engaged with the sidewall 160*a*, the size of the gap 240 between the legs 234*a*, 234*b* increases as the first leg 234*a* is moved with the rotational movement of the second arm 200, as seen by a comparison of FIGS. 19 and 20. Upon removal of the force that was at least displacing the cam 106 in the second, counterclockwise direction, such as, for example, upon a user releasing the handle 30, the biasing element 108 can exert a force against the second arm 200 that facilitates the displacement of the cam 106 in the first, clockwise direction, and back to the home, or locked, position. Such a return of the cam 106 to the home, or locked, position by the biasing force provided, or supplemented by, the inclusion of the biasing element 108 can thus at least assist in returning the drive spindle 32 and tailpiece 112 to their associated home positions.

Similarly, in situations in which the handing body 216 is positioned in the second outer and inner handing apertures 138, 144, as a rotational force, such as a force associated with displacing the handle 30 from the locked position, is transmitted from the handle 30 to the cam 106 via at least the drive spindle 32, the cam 106 can be rotated away from the home position (FIG. 19) in the first, clockwise direction. Such rotational displacement of the cam 106 can cause the second arm 200 to exert a force against the second leg 234*b* of the biasing element 108, while the first leg 234*a* of the biasing element 106 remains engaged with, or anchored by, a sidewall 160*b* of the support plate 108. Moreover, as the first leg 234*a* of the biasing element 106 remains at a relatively static position while engaged with the sidewall 160*b*, the size of the gap 240 between the legs 234*a*, 234*b* increases as the second leg 234*b* is moved with the rotational movement of the second arm 200. Upon removal of the force that was at least displacing the cam 106 in the first, clockwise direction, such as, for example, upon a user releasing the handle 30 at the unlocked position, the biasing element 108 can exert a force against the second arm 200 that facilitates the displacement of the cam 106 in the second, counterclockwise direction, and back to the home, or locked, position. Such a return of the cam 106 to the home, or locked, position by the biasing force provided, or supplemented by, the inclusion of the biasing element 108 can thus, again, at least assist in returning the drive spindle 32 and tailpiece 112 to their associated home positions.

By at least aiding in the return of the drive spindle 32 and tailpiece 112 to their respective home positions, the recentering adapter 100 can aid with the operation of the first cam assembly 50 and the second cam assembly 51. Moreover, by at least assisting with the return of the drive spindle 32 and the tailpiece 112 to their respective home, or locked, positions, the recentering adapter 100 can, for example, assist in maintaining an alignment of corresponding projections or notches in one or more mating slots or grooves of the first and second cams 50, 51, respectively, that are utilized in the selective translation of rotational forces in connection with operation of at least the latch mechanism 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A recentering adapter for biasing a position of at least a drive spindle and a tailpiece of an exit device assembly, the recentering adapter comprising:
- a housing comprising a first opening;
- a cover comprising a second opening, the cover configured for removable coupling to the housing, the cover and the housing defining at least a portion of an interior area of the recentering adapter;
- a support plate configured for placement in the interior area, the support plate comprising a first protrusion and a second protrusion, wherein the first protrusion comprises:
  - a first inner handing aperture aligned with a first outer handing aperture of the cover to thereby provide a first aperture pair, wherein the first aperture pair is configured to receive selective insertion of a handing body; and
  - a second inner handing aperture aligned with a second outer handing aperture of the cover to thereby provide a second aperture pair, wherein the second aperture pair is configured to receive selective insertion of the handing body;
- a biasing element comprising a first leg and a second leg, at least a portion of the second protrusion is positioned in a gap between the first and second legs of the biasing element; and
- a cam comprising a first end, a second end, a first arm, and a second arm, the first end aligned with the first opening and configured for coupling to the tailpiece, the second end aligned with the second opening and configured for coupling to the drive spindle, the cam being mounted for rotation relative to the support plate in each of a first direction and a second direction from a home position within the interior area, wherein, when the cam is rotated in the first direction, the first leg of the biasing element is displaced by engagement with the second arm as the cam is rotated and the second leg remains engaged with the second protrusion, the biasing element being configured to bias the cam to the home position;

wherein, with the handing body received in the first aperture pair, the handing body interferes with the first arm to thereby prevent rotation of the cam away from the home position in the second direction; and wherein, with the handing body received in the second aperture pair, the handing body interferes with the first arm to thereby prevent rotation of the cam away from the home position in the first direction.

2. The recentering adapter of claim 1, wherein the recentering adapter is configured for the handing body to be selectively removable from the recentering adapter from a location outside of the interior area while the cover is securely coupled to the housing.

3. The recentering adapter of claim 1, wherein the recentering adapter is configured for a driving force outside of the interior area to selectively drive the handing body into engagement with either the first aperture pair or the second aperture pair while the cover is securely coupled to the housing.

4. The recentering adapter of claim 1, wherein when the handing body is positioned in the second aperture pair, the second leg of the biasing element is displaced by engagement with the second arm as the cam is rotated in the second direction, the first leg remaining engaged with the second protrusion as the cam is rotated in the second direction.

5. The recentering adapter of claim 1, wherein the first and second inner handing apertures are positioned on opposite sides of the first protrusion.

6. The recentering adapter of claim 1, wherein the support plate and the housing form a monolithic structure.

7. The recentering adapter of claim 1, wherein the first end of the cam includes a first aperture configured to receive placement of at least a portion of the tailpiece and the second end includes a second aperture configured to receive placement of at least a portion of the drive spindle, and wherein the recentering adapter is configured to bias a first cam coupled to the tailpiece to a first home position and bias a second cam coupled to the drive spindle to a second home position.

8. The recentering adapter of claim 1, wherein the cam includes a guide wall configured to engage the support plate in a manner that limits an extent to which the first end of the cam extends through the first opening of the housing.

9. A recentering adapter comprising:

a housing comprising a first opening;

a cover plate comprising a second opening, the cover plate being selectively attachable to the housing, the housing and the cover plate defining an interior area of the recentering adapter;

a support plate comprising a first protrusion, a second protrusion, and a support plate opening;

a cam comprising a first end, a second end, a first arm, and a second arm, the cam configured for the first end to align with the first opening and the second end to align with the second opening as a portion of the cam is positioned within the support plate opening, the cam being rotatable relative to the support plate in each of a first rotational direction and a second rotational direction opposite the first rotational direction;

a biasing element comprising an orifice, a first leg, and a second leg, the first and second legs defining an adjustable gap between the first and second legs, at least a portion of the second protrusion and the second arm being positioned within the adjustable gap, wherein the biasing element engages the cam to bias the cam to a home position;

a first aperture pair defined by the second protrusion and the cover plate, wherein the first aperture pair is operable to receive a handing body at a first mounting location;

a second aperture pair defined by the second protrusion and the cover plate, wherein the first aperture pair is operable to receive a handing body at a second mounting location different from the first mounting location;

wherein, with the handing body received in the first aperture pair at the first mounting location, the handing body prevents rotation of the cam from the home position in a second rotational direction opposite the first rotational direction; and wherein, with the handing body received in the second aperture pair at the second mounting location, the handing body prevents rotation of the cam from the home position in the first rotational direction.

10. The recentering adapter of claim 9, wherein the second protrusion includes a first inner handing aperture and a second inner handing aperture, the first inner handing aperture aligned with a first outer handing aperture of the cover plate to thereby provide the first aperture pair, the second inner handing aperture aligned with a second outer handing aperture of the cover plate to thereby provide the second aperture pair.

11. The recentering adapter of claim 10, wherein the recentering adapter is configured for the handing body to be selectively removable from the recentering adapter from a location outside of the interior area while the cover plate is securely coupled to the housing.

12. The recentering adapter of claim 10, wherein the recentering adapter is configured for a driving force outside of the interior area to selectively drive the handing body into engagement with either the first aperture pair or the second aperture pair while the cover plate is securely coupled to the housing.

13. The recentering adapter of claim 10, wherein when the handing body is positioned in the second aperture pair, the second leg of the biasing element is displaced by engagement with the second arm as the cam is rotated in the second direction, the first leg remaining engaged with the second protrusion as the cam is rotated in the second direction.

14. The recentering adapter of claim 10, wherein the first and second inner handing apertures are positioned on opposite sides of the first protrusion.

15. The recentering adapter of claim 9, wherein the support plate and the housing form a monolithic structure.

16. The recentering adapter of claim 9, wherein the first end of the cam includes a first aperture configured to receive placement of at least a portion of a tailpiece that is coupled to a first cam, the second end includes a second aperture configured to receive placement of at least a portion of a drive spindle that is coupled to a second cam, and wherein the recentering adapter is configured to bias the first cam to a first home position and bias a second cam coupled to a second home position.

17. A recentering adapter comprising:

a housing comprising a first opening;

a cover plate comprising a second opening, a first outer handing aperture, and a second outer handing aperture, the cover plate being selectively attachable to the housing, the housing and the cover plate defining an interior area of the recentering adapter;

a support plate comprising a first protrusion and a second protrusion, the first protrusion comprising a first inner handing aperture and a second inner handing aperture, the first inner handing aperture and the first outer handing aperture providing a first aperture pair, the second inner handing aperture and the second outer handing aperture providing a second aperture pair;

a cam comprising a first end, a second end, a first arm, and a second arm, the cam configured for the first end to align with the first opening and the second end to align with the second opening as a portion of the cam is positioned within the interior area, the cam being configured for a rotational displacement of the cam relative to the support plate; and a biasing element comprising a first leg and a second leg, the first and second legs defining an adjustable gap between the first and second legs, at least a portion of the second protrusion and the second arm being positioned within the adjustable gap; and a handing body configured for selective insertion into either the first aperture pair or the second aperture pair, wherein, when the handing body is selectively positioned in the first aperture pair, the handing body is positioned to engage the first arm to prevent the rotational displacement of the cam away from a home position in a second direction, wherein, when the handing body is selectively positioned in the second aperture pair, the handing body is positioned to engage the first arm to prevent the rotational displacement of the cam away from the home position in a first direction that is opposite to the second direction, wherein as the cam is selectively rotated away from the home position in the first direction, the first leg is displaced with the second arm away from the second protrusion as the second leg remains engaged with the second protrusion, wherein as the cam is selectively rotated away from the home position in the second direction, the second leg is displaced with the second arm away from the second protrusion as the first leg remains engaged with the second protrusion, and wherein the biasing element is engaged with the cam to bias the cam to the home position.

18. The recentering adapter of claim 17, wherein the recentering adapter is configured for the handing body to be selectively removable from engagement with either of the first aperture pair and the second aperture pair from a location outside of the interior area while the cover plate is securely coupled to the housing.

19. The recentering adapter of claim 17, wherein the recentering adapter is configured for a driving force outside of the interior area to selectively drive the handing body into engagement with either of the first aperture pair and the second aperture pair while the cover plate is securely coupled to the housing.

* * * * *